US012657398B2

(12) United States Patent
Dev et al.

(10) Patent No.: US 12,657,398 B2
(45) Date of Patent: Jun. 16, 2026

(54) SYSTEM, METHOD, AND COMPUTER PROGRAM PRODUCT FOR DEBIASING EMBEDDING VECTORS OF MACHINE LEARNING MODELS

(71) Applicant: Visa International Service Association, San Francisco, CA (US)

(72) Inventors: Sunipa Dev, Los Angeles, CA (US); Yan Zheng, Los Gatos, CA (US); Michael Yeh, Newark, CA (US); Junpeng Wang, Santa Clara, CA (US); Wei Zhang, Fremont, CA (US); Archit Rathore, Salt Lake City, UT (US)

(73) Assignee: Visa International Service Association, San Francisco, CA (US)

( * ) Notice: Subject to any disclaimer, the term of this patent is extended or adjusted under 35 U.S.C. 154(b) by 175 days.

(21) Appl. No.: 18/280,792

(22) PCT Filed: Mar. 30, 2022

(86) PCT No.: PCT/US2022/022474
§ 371 (c)(1),
(2) Date: Sep. 7, 2023

(87) PCT Pub. No.: WO2022/212453
PCT Pub. Date: Oct. 6, 2022

(65) Prior Publication Data
US 2024/0160854 A1       May 16, 2024

Related U.S. Application Data

(60) Provisional application No. 63/167,737, filed on Mar. 30, 2021.

(51) Int. Cl.
*G06F 40/40* (2020.01)

(52) U.S. Cl.
CPC ................................... *G06F 40/40* (2020.01)

(58) Field of Classification Search
CPC ......... G06F 40/40; G06N 3/045; G06N 3/088
See application file for complete search history.

(56) References Cited

U.S. PATENT DOCUMENTS 10,671,942 B1     6/2020  McGovern et al.
11,526,508 B1 *  12/2022  McCallie, Jr.  ........ G06F 40/284
(Continued)

FOREIGN PATENT DOCUMENTS

EP          3483797 A1     5/2019

OTHER PUBLICATIONS

Popovic et al. "Joint Multiclass Debiasing of Word Embeddings". arXiv:2003.11520v1 [cs.CL] Mar. 9, 2020 (Year: 2020).*
(Continued)

*Primary Examiner* — Jesse S Pullias
(74) *Attorney, Agent, or Firm* — The Webb Law Firm

(57)                ABSTRACT

Described are a system, method, and computer program product for debiasing embedding vectors of machine learning models. The method includes receiving embedding vectors and generating two clusters thereof. The method includes determining a first mean vector of the first cluster and a second mean vector of the second cluster. The method includes determining a bias associated with each of a plurality of first candidate vectors and replacing the first mean vector with a first candidate vector based on the bias. The method includes determining a bias associated with each of a plurality of second candidate vectors and replacing the second mean vector with a second candidate vector based on the bias. The method includes repeatedly replacing the first and second mean vectors until an extremum of the
(Continued)

bias score is reached, and debiasing the embedding vectors by linear projection using a direction defined by the first and second mean vectors.

15 Claims, 10 Drawing Sheets

(56) References Cited

U.S. PATENT DOCUMENTS

| | | | | |
|---|---|---|---|---|
| 2017/0372318 | A1* | 12/2017 | Shami | G06Q 20/4016 |
| 2019/0147371 | A1* | 5/2019 | Deo | G06N 20/20 |
| | | | | 706/12 |
| 2020/0314101 | A1 | 10/2020 | Zhang et al. | |
| 2021/0124780 | A1* | 4/2021 | Silva | G06F 18/217 |
| 2021/0150631 | A1* | 5/2021 | Resheff | G06Q 40/12 |
| 2021/0350285 | A1* | 11/2021 | Malur Srinivasan | |
| | | | | G06F 3/0482 |
| 2022/0147713 | A1* | 5/2022 | Garimella | G06F 40/56 |
| 2022/0198470 | A1* | 6/2022 | Melul | G06Q 30/0185 |
| 2022/0245339 | A1* | 8/2022 | Panda | G06N 3/047 |

OTHER PUBLICATIONS

Celikkanat et al. "Tracking the Traces of Passivization and Negation in Contextualized Representations". Proceedings of the Third BlackboxNLP Workshop on Analyzing and Interpreting Neural Networks for NLP, pp. 136-148 Online, Nov. 20, 2020 (Year : 2020).*
Ravfogel et al. "Null It Out: Guarding Protected Attributes by Iterative Nullspace Projection". arXiv:2004.07667v2 [cs. CL] Apr. 28, 2020 (Year: 2020).*
Abadi et al., "TensorFlow: A System for Large-Scale Machine Learning", Usenix, 2016, pp. 265-283.
Amershi et al., "ModelTracker: Redesigning Performance Analysis Tools for Machine Learning", 2015, 10 pages.
Arrieta et al., "Explainable Artificial Intelligence (XAI): Concepts, Taxonomies, Opportunities and Challenges toward Responsible AI", 2019, pp. 1-72.
Bolukbasi et al., "Man is to Computer Programmer as Woman is to Homemaker? Debiasing Word Embeddings", 30th Conference on Neural Information Processing Systems (NIPS 2016), 2016, pp. 1-9.
Cabrera et al., "FAIRVIS: Visual Analytics for Discovering Intersectional Bias in Machine Learning", 2019, 11 pages.
Caliskan et al., "Semantics derived automatically from language corpora necessarily contain human biases", 2017, 14 pages.
Chen et al., "OoDAnalyzer: Interactive Analysis of Out-of-Distribution Samples", 2020, 16 pages.
Choo et al., "Visual Analytics for Explainable Deep Learning", 10 pages, Aug. 2018.
Chuang et al., "Termite: Visualization Techniques for Assessing Textual Topic Models", 2012, 4 pages.
Dev et al., "On Measuring and Mitigating Biased Inferences of Word Embeddings", 2019, 11 pages.
Dev et al., "Closed Form Word Embedding Alignment", 2020, 13 pages.
Dev et al., "Attenuating Bias in Word Vectors", 2019, 17 pages.
Dev et al., "OSCAR: Orthogonal Subspace Correction and Rectification of Biases in Word Embeddings", Proceedings of the 2021 Conference on Empirical Methods in Natural Language Processing, 2021, pp. 5034-5050.
Dev et al., "On Measuring and Mitigating Biased Inferences of Word Embeddings", The Thirty-Fourth AAAI Conference on Artificial Intelligence (AAAI-20), 2020, pp. 7659-7666.
Devlin et al., "BERT: Pre-training of Deep Bidirectional Transformers for Language Understanding", Proceedings of NAACL-HLT, 2019, pp. 4171-4186.
Du et al., "Pcard: Personalized Restaurants Recommendation from Card Payment Transaction Records", 2019, 7 pages.

Facets, "Facets—Visualization for ML datasets", retrieved from https://paircode.github.io/facets/, Feb. 21, 2024.
Ghosh et al., "VisExPreS: A Visual Interactive Toolkit for User-Driven Evaluations of Embeddings", IEEE Transactions on Visualization and Computer Graphics, 2022, pp. 2791-2807, vol. 28, No. 7.
Gonen et al., "Lipstick on a Pig: Debiasing Methods Cover up Systematic Gender Biases in Word Embeddings But do not Remove Them", 2019, 6 pages.
Google, "Visually probe the behavior of trained machine learning models, with minimal coding", What-If Tool, retrieved from https://pair-code.github.io/what-if-tool/, Feb. 22, 2024.
Heimerl et al., "embComp: Visual Interactive Comparison of Vector Embeddings", 2021, pp. 1-16.
Heimerl et al., "Interactive Analysis of Word Vector Embeddings", Eurographics Conference on Visualization (EuroVis), 2018, 13 pages, vol. 37, No. 3.
Hinterreiter et al., "ConfusionFlow: A model-agnostic visualization for temporal analysis of classifier confusion", IEEE Transactions on Visualization and Computer Graphics, 2020, pp. 1-15.
Kahng et al., "Visual Exploration of Machine Learning Results using Data Cube Analysis", 2016, 6 pages.
Krause et al., "INFUSE: Interactive Feature Selection for Predictive Modeling of High Dimensional Data", IEEE Transactions on Visualization and Computer Graphics, 2014, pp. 1614-1623, vol. 20, No. 12.
Kusner et al., "Counterfactual Fairness", 31st Conference on Neural Information Processing Systems (NIPS 2017), 2017, pp. 1-11.
Li et al., "EmbeddingVis: A visual Analytics Approach to Comparative Network Embedding Inspection", 2018, 12 pages.
Liu et al., "Towards Better Analysis of Machine Learning Models: A Visual Analytics Perspective", 2017, pp. 1-23.
Liu et al., "LatentVis: Investigating and Comparing Variational Auto-Encoders via Their Latent Space", Proceedings of the CIKM 2020 Workshops, 2020, 10 pages.
Liu et al., "NLIZE: A Perturbation-Driven Visual Interrogation Tool for Analyzing and Interpreting Natural Language Inference Models", 10 pages, Jan. 2019.
Liu et al., "Visual Exploration of Semantic Relationships in Neural Word Embeddings", 10 pages.
Liu et al., "Latent Space Cartography: Visual Analysis of Vector Space Embeddings", Eurographics Conference on Visualization (EuroVis), 2019, 12 pages, vol. 38, No. 3.
Liu et al., "Visual Interrogation of Attention-Based Models for Natural Language Inference and Machine Comprehension", Proceedings of the 2018 Conference on Empirical Methods in Natural Language Processing (System Demonstrations), 2018, pp. 36-41.
Liu et al., "Towards Better Analysis of Deep Convolutional Neural Networks", IEEE Transactions on Visualization and Computer Graphics, 2017, pp. 91-100, vol. 23, No. 1.
Liu et al., "Visual Diagnosis of Tree Boosting Methods", IEEE Transactions on Visualization and Computer Graphics, 2018, pp. 163-173, vol. 24, No. 1.
Liu et al., "Visualizing High-Dimensional Data: Advances in the Past Decade", IEEE Transactions on Visualization and Computer Graphics, 2017, pp. 1249-1268, vol. 23, No. 3.
Liu et al., "StoryFlow: Tracking the Evolution of Stories", IEEE Transactions on Visualization and Computer Graphics, 2013, pp. 2436-2445, vol. 19, No. 12.
Liu et al., "Online Visual Analytics of Text Streams", IEEE Transactions on Visualization and Computer Graphics, 2016, pp. 2451-2466, vol. 22, No. 11.
May et al., "Guiding Feature Subset Selection with an Interactive Visualization", IEEE Symposium on Visual Analytics Science and Technology, 2011, pp. 111-120.
Mcinnes et al., "UMAP: Uniform Manifold Approximation and Projection", Journal of Open Source Software, 2018, pp. 1-2, vol. 3, No. 29.
Mcinnes et al., "UMAP: Uniform Manifold Approximation and Projection for Dimension Reduction", 2020, pp. 1-63.
Mikolov et al., "Distributed Representations of Words and Phrases and their Compositionality", pp. 1-9. 2013.

(56) References Cited

OTHER PUBLICATIONS

Pedregosa et al., "Scikit-learn: Machine Learning in Python", Journal of Machine Learning Research, 2011, pp. 2825-2830, vol. 12.

Pennington et al., "GloVe: Global Vectors for Word Representation", Proceedings of the 2014 Conference on Empirical Methods in Natural Language Processing (EMNLP), 2014, pp. 1532-1543.

Pezzotti et al., "DeepEyes: Progressive Visual Analytics for Designing Deep Neural Networks", IEEE Transactions on Visualization and Computer Graphics, 2018, pp. 1-10.

Rathore et al., "TopoAct: Visually Exploring the Shape of Activations in Deep Learning", 2021, pp. 1-18.

Rauber et al., "Visualizing the Hidden Activity of Artificial Neural Networks", 2017, 10 pages.

Ravfogel et al., "Null It Out: Guarding Protected Attributes by Iterative Nullspace Projection", Proceedings of the 58th Annual Meeting of the Association for Computational Linguistics, 2020, pp. 7237-7256.

Ren et al., "Squares: Supporting Interactive Performance Analysis for Multiclass Classifiers", 10 pages, Jan. 2017.

Ribeiro et al., "Why Should I Trust You?' Explaining the Predictions of Any Classifier", Proceedings of NAACL-HLT 2016 (Demonstrations), 2016, pp. 97-101.

Smilkov et al., "Embedding Projector: Interactive Visualization and Interpretation of Embeddings", 30th Conference on Neural Information Processing Systems (NIPS), 2016, pp. 1-4.

Smith et al., "Hierarchie: Interactive Visualization for Hierarchical Topic Models", Proceedings of the Workshop on Interactive Language Learning, Visualization, and Interfaces, 2014, pp. 71-78.

Smith et al., "Concurrent Visualization of Relationships between Words and Topics in Topic Models", Proceedings of the Workshop on Interactive Language Learning, Visualization, and Interfaces, 2014, pp. 79-82.

Springenberg et al., "Striving for Simplicity: The All Convolutional Net", 2015, pp. 1-14.

Van Der Maaten et al., "Visualizing Data using t-SNE", Journal of Machine Learning Research, 2008, pp. 2579-2605, vol. 9.

Wang et al., "Feature Detection and Attenuation in Embeddings", 2021, pp. 1-11.

Wang et al., "SentiView: Sentiment Analysis and Visualization for Internet Popular Topics", IEEE Transactions on Human-Machine Systems, 2013, pp. 1-11.

Wang et al., "GANViz: A Visual Analytics Approach to Understand the Adversarial Game", IEEE Transactions on Visualization and Computer Graphics, 2018, pp. 1-12.

Wang et al., "Double-Hard Debias: Tailoring Word Embeddings for Gender Bias Mitigation", 2020, 11 pages.

Wang et al., "SCANViz: Interpreting the Symbol-Concept Association Captured by Deep Neural Networks through Visual Analytics", 2020, 11 pages.

Wongsuphasawat et al., "Visualizing Dataflow Graphs of Deep Learning Models in TensorFlow", 12 pages. Jan. 2018.

Yang et al., "Diagnosing Concept Drift with Visual Analytics", 2020, 12 pages.

Yeh et al., "Merchant Category Identification Using Credit Card Transactions", Visa Research, 2020, 9 pages.

Yeh et al., "Towards a Flexible Embedding Learning Framework", Visa Research, 2020, 10 pages.

Yuan et al., "A survey of visual analytics techniques for machine learning", Computational Visual Media, 2021, pp. 3-36, vol. 7, No. 1.

Zhao et al., "Learning Gender-Neutral Word Embeddings", Proceedings of the 2018 Conference on Empirical Methods in Natural Language Processing, 2018, pp. 4847-4853.

* cited by examiner

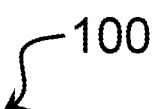
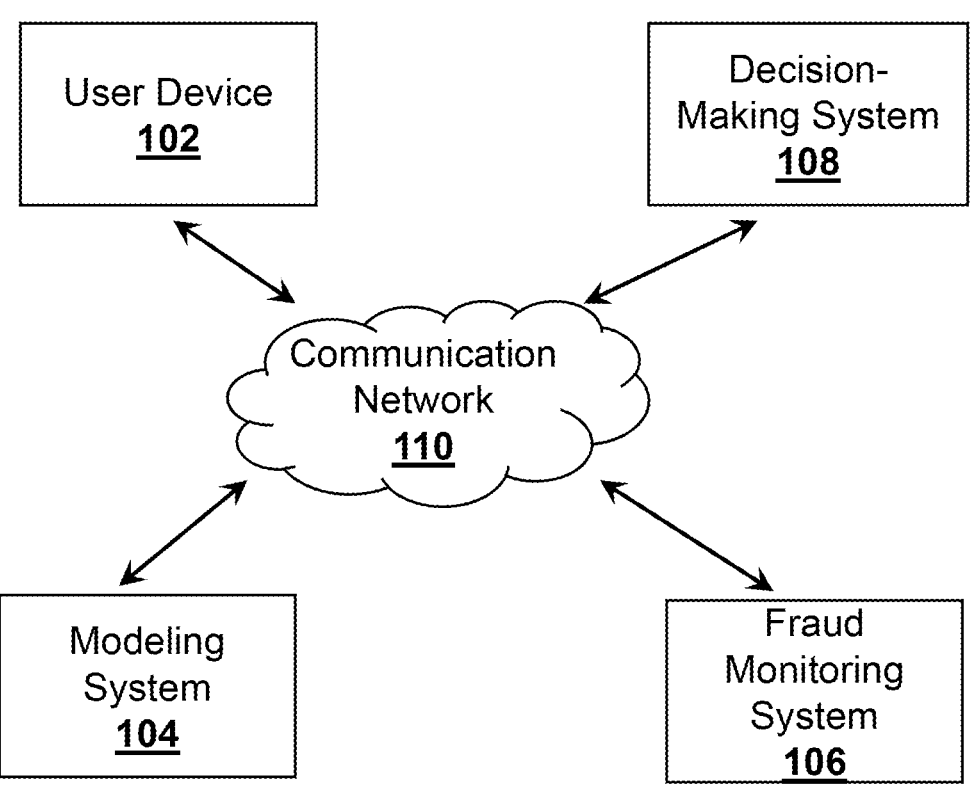
FIG. 1

300

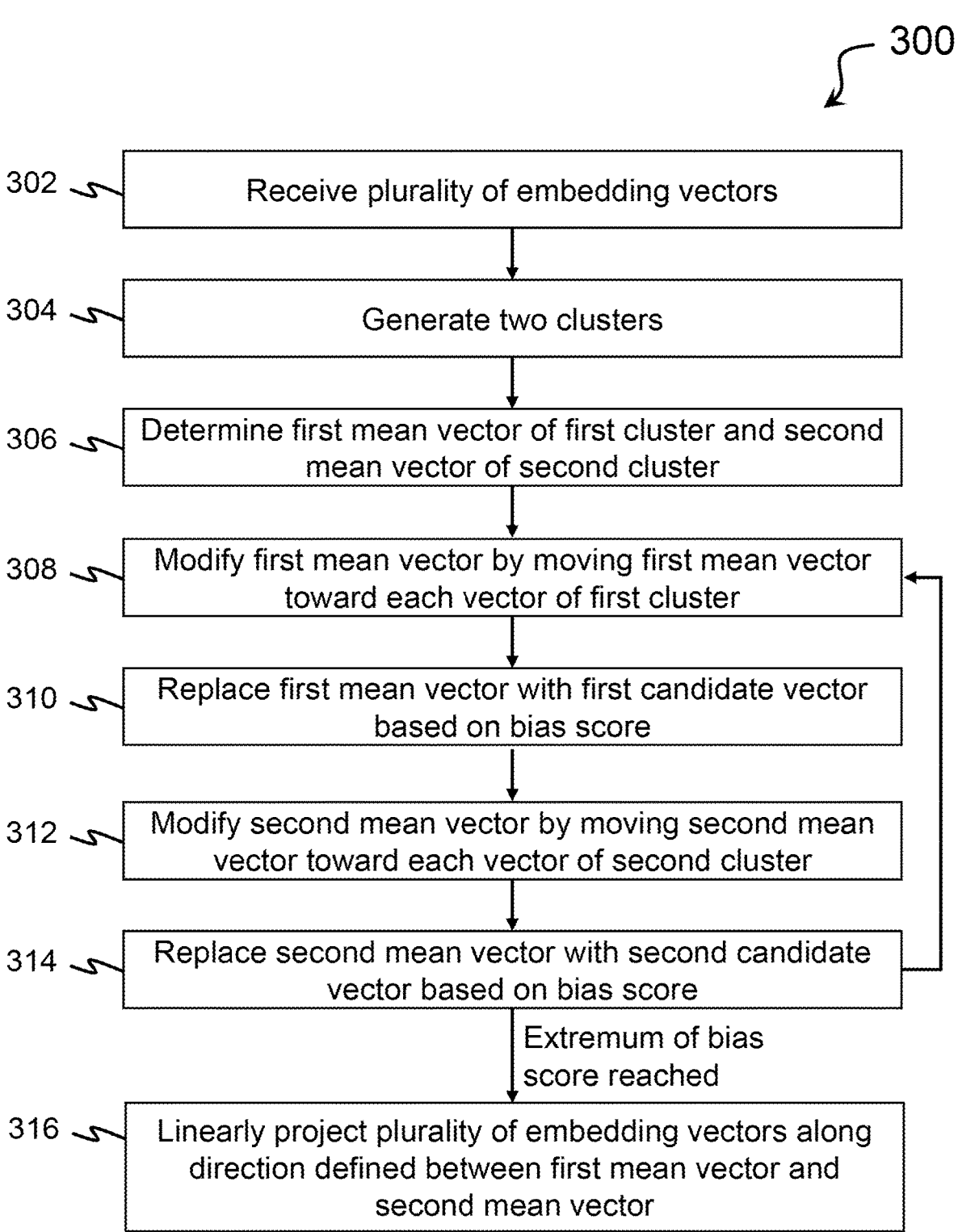

302 — Receive plurality of embedding vectors

304 — Generate two clusters

306 — Determine first mean vector of first cluster and second mean vector of second cluster 308 — Modify first mean vector by moving first mean vector toward each vector of first cluster 310 — Replace first mean vector with first candidate vector based on bias score 312 — Modify second mean vector by moving second mean vector toward each vector of second cluster 314 — Replace second mean vector with second candidate vector based on bias score Extremum of bias score reached 316 — Linearly project plurality of embedding vectors along direction defined between first mean vector and second mean vector

FIG. 3

SYSTEM, METHOD, AND COMPUTER PROGRAM PRODUCT FOR DEBIASING EMBEDDING VECTORS OF MACHINE LEARNING MODELS

CROSS REFERENCE TO RELATED APPLICATIONS

This application is the United States national phase of International Application No. PCT/US2022/022474 filed Mar. 30, 2022, and claims priority to U.S. Provisional Patent Application No. 63/167,737 filed Mar. 30, 2021, the disclosures of which are hereby incorporated by reference in their entirety.

BACKGROUND

1. Technical Field

The present disclosure relates to machine learning models and natural language processing. Particularly, but not exclusively, the present disclosure relates to debiasing embedding vectors of neural network machine learning models.

2. Technical Considerations

An embedding vector may include a relatively low-dimensional vector representation of relatively higher-dimensional vectors. For example, an embedding vector may represent a mapping of the higher-dimensional vector (e.g., representing a discrete and/or categorical variable, a high-dimensional data record, and/or the like) into a lower-dimensional space. In machine learning modeling, including neural networks, embedding vectors may include multi-dimensional, learned continuous vector representations of the higher dimensional vectors. Natural language processing (NLP) may map words to vector representations (e.g., embedding vectors, word embeddings, and/or the like). Embedding vectors with similar representations (e.g., relatively short distance between the two vectors) may be considered to be similar (e.g., have a similar meaning, value, context, and/or the like).

However, embedding vectors may reflect and/or amplify biases in data from which they are generated. For example, biased embedding vectors used in machine learning models may reduce the accuracy and efficiency of computer systems executing the machine learning models.

There is a need in the art for a technical solution to debias the geometry of embedding vectors to improve the accuracy, fairness, and efficiency of computer-driven, decision-making systems employing the embedding vectors.

SUMMARY

Additional features and advantages are realized through the techniques of the present disclosure. Other non-limiting embodiments and aspects of the present disclosure are described in detail herein and are considered a part of the claimed disclosure.

According to non-limiting embodiments or aspects, provided is a computer-implemented method for debiasing embedding vectors of machine learning models. The method may include receiving, with at least one processor, a plurality of embedding vectors from a neural network model. The method may also include generating, with the at least one processor, two clusters of embedding vectors based on the plurality of embedding vectors. The two clusters may include a first cluster of embedding vectors expected to be biased in a first direction and a second cluster expected to be biased in a second direction. The method may further include determining, with the at least one processor, a first mean vector of the first cluster of embedding vectors and a second mean vector of the second cluster of embedding vectors. The method may further include modifying, with the at least one processor, the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector. The method may further include replacing, with the at least one processor, the first mean vector with a first candidate vector of the plurality of first candidate vectors based on the bias score of the first candidate vector. The method may further include modifying, with the at least one processor, the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine a bias score associated with each second candidate vector. The method may further include replacing, with the at least one processor, the second mean vector with a second candidate vector of the plurality of second candidate vectors based on the bias score of the second candidate vector. The method may further include repeating, with the at least one processor, the modifying of the first mean vector, the replacing of the first mean vector, the modifying of the second mean vector, and the replacing of the second mean vector until an extremum of the bias score is reached. The method may further include, in response to reaching the extremum of the bias score, linearly projecting, with the at least one processor, each embedding vector of the plurality of embedding vectors along a direction defined between the first mean vector and the second mean vector to debias the plurality of embedding vectors.

In some non-limiting embodiments or aspects, the plurality of embedding vectors may be vector representations of word embeddings and the neural network model may include a natural language processing (NLP) model.

In some non-limiting embodiments or aspects, the plurality of embedding vectors may be vector representations of merchant identity embeddings generated from customer transaction data. The method may further include modifying, with the at least one processor, a machine learning model of a fraud monitoring system using the plurality of embedding vectors that have been debiased by linearly projecting each embedding vector of the plurality of embedding vectors using the direction defined between the first mean vector and the second mean vector.

In some non-limiting embodiments or aspects, the bias score may be calculated from a Word Embedding Association Test (WEAT). The bias score may also be calculated from an Embedding Coherence Test (ECT).

In some non-limiting embodiments or aspects, the method may further include, before modifying the first mean vector and the second mean vector, determining, with the at least one processor, an initial bias score by linearly projecting the embedding vectors of both the first cluster and the second cluster along an initial direction defined between the first mean vector and the second mean vector. The replacing of the first mean vector with the first candidate vector of the plurality of first candidate vectors may be based on maximizing a difference between the initial bias score and the bias score of the first candidate vector. The replacing of the second mean vector with the second candidate vector of the plurality of second candidate vectors may be based on maximizing a difference between the initial bias score and the bias score of the second candidate vector.

According to non-limiting embodiments or aspects, provided is a system for debiasing embedding vectors of machine learning models. The system may include a server including at least one processor. The server may be programmed or configured to receive a plurality of embedding vectors from a neural network model. The server may be programmed or configured to generate two clusters of embedding vectors based on the plurality of embedding vectors, the two clusters comprising a first cluster of embedding vectors expected to be biased in a first direction and a second cluster expected to be biased in a second direction. The server may be programmed or configured to determine a first mean vector of the first cluster of embedding vectors and a second mean vector of the second cluster of embedding vectors. The server may be programmed or configured to modify the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector. The server may be programmed or configured to replace the first mean vector with a first candidate vector of the plurality of first candidate vectors based on the bias score of the first candidate vector. The server may be programmed or configured to modify the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine a bias score associated with each second candidate vector. The server may be programmed or configured to replace the second mean vector with a second candidate vector of the plurality of second candidate vectors based on the bias score of the second candidate vector. The server may be programmed or configured to repeat the modifying of the first mean vector, the replacing of the first mean vector, the modifying of the second mean vector, and the replacing of the second mean vector until an extremum of the bias score is reached. The server may be programmed or configured to, in response to reaching the extremum of the bias score, linearly project each embedding vector of the plurality of embedding vectors along a direction defined between the first mean vector and the second mean vector to debias the plurality of embedding vectors.

In some non-limiting embodiments or aspects, the plurality of embedding vectors may be vector representations of word embeddings and the neural network model comprises a natural language processing (NLP) model.

In some non-limiting embodiments or aspects, the plurality of embedding vectors may be vector representations of merchant identity embeddings generated from customer transaction data.

In some non-limiting embodiments or aspects, the server may be further programmed or configured to modify a machine learning model of a fraud monitoring system using the plurality of embedding vectors that have been debiased by linearly projecting each embedding vector of the plurality of embedding vectors using the direction defined between the first mean vector and the second mean vector.

In some non-limiting embodiments or aspects, the bias score may be calculated from a Word Embedding Association Test (WEAT).

In some non-limiting embodiments or aspects, the bias score may be calculated from an Embedding Coherence Test (ECT).

In some non-limiting embodiments or aspects, the server may be further programmed or configured to, before modifying the first mean vector and the second mean vector, determine an initial bias score by linearly projecting the embedding vectors of both the first cluster and the second cluster along an initial direction defined between the first mean vector and the second mean vector. The replacing of the first mean vector with the first candidate vector of the plurality of first candidate vectors may be based on maximizing a difference between the initial bias score and the bias score of the first candidate vector. The replacing of the second mean vector with the second candidate vector of the plurality of second candidate vectors may be based on maximizing a difference between the initial bias score and the bias score of the second candidate vector.

According to non-limiting embodiments or aspects, provided is a computer program product for debiasing embedding vectors of machine learning models. The computer program product may include at least one non-transitory computer-readable medium including program instructions that, when executed by at least one processor, cause the at least one processor to receive a plurality of embedding vectors from a neural network model. The instructions may cause the at least one processor to generate two clusters of embedding vectors based on the plurality of embedding vectors, the two clusters comprising a first cluster of embedding vectors expected to be biased in a first direction and a second cluster expected to be biased in a second direction. The instructions may cause the at least one processor to determine a first mean vector of the first cluster of embedding vectors and a second mean vector of the second cluster of embedding vectors. The instructions may cause the at least one processor to modify the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector. The instructions may cause the at least one processor to replace the first mean vector with a first candidate vector of the plurality of first candidate vectors based on the bias score of the first candidate vector. The instructions may cause the at least one processor to modify the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine a bias score associated with each second candidate vector. The instructions may cause the at least one processor to replace the second mean vector with a second candidate vector of the plurality of second candidate vectors based on the bias score of the second candidate vector. The instructions may cause the at least one processor to repeat the modifying of the first mean vector, the replacing of the first mean vector, the modifying of the second mean vector, and the replacing of the second mean vector until an extremum of the bias score is reached. The instructions may cause the at least one processor to, in response to reaching the extremum of the bias score, linearly project each embedding vector of the plurality of embedding vectors along a direction defined between the first mean vector and the second mean vector to debias the plurality of embedding vectors.

In some non-limiting embodiments or aspects, the plurality of embedding vectors may be vector representations of word embeddings and the neural network model comprises a natural language processing (NLP) model.

In some non-limiting embodiments or aspects, the plurality of embedding vectors may be vector representations of merchant identity embeddings generated from customer transaction data.

In some non-limiting embodiments or aspects, the instructions, when executed by at least one processor, may further cause the at least one processor to modify a machine learning model of a fraud monitoring system using the plurality of embedding vectors that have been debiased by linearly projecting each embedding vector of the plurality of embedding vectors using the direction defined between the first mean vector and the second mean vector.

In some non-limiting embodiments or aspects, the bias score may be calculated from a Word Embedding Association Test (WEAT).

In some non-limiting embodiments or aspects, the bias score may be calculated from an Embedding Coherence Test (ECT).

In some non-limiting embodiments or aspects, the instructions, when executed by at least one processor, may further cause the at least one processor to, before modifying the first mean vector and the second mean vector, determine an initial bias score by linearly projecting the embedding vectors of both the first cluster and the second cluster along an initial direction defined between the first mean vector and the second mean vector. The replacing of the first mean vector with the first candidate vector of the plurality of first candidate vectors may be based on maximizing a difference between the initial bias score and the bias score of the first candidate vector. The replacing of the second mean vector with the second candidate vector of the plurality of second candidate vectors may be based on maximizing a difference between the initial bias score and the bias score of the second candidate vector.

Other non-limiting embodiments or aspects of the present disclosure will be set forth in the following numbered clauses:

Clause 1: A computer-implemented method comprising: receiving, with at least one processor, a plurality of embedding vectors from a neural network model; generating, with the at least one processor, two clusters of embedding vectors based on the plurality of embedding vectors, the two clusters comprising a first cluster of embedding vectors expected to be biased in a first direction and a second cluster expected to be biased in a second direction; determining, with the at least one processor, a first mean vector of the first cluster of embedding vectors and a second mean vector of the second cluster of embedding vectors; modifying, with the at least one processor, the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector; replacing, with the at least one processor, the first mean vector with a first candidate vector of the plurality of first candidate vectors based on the bias score of the first candidate vector; modifying, with the at least one processor, the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine a bias score associated with each second candidate vector; replacing, with the at least one processor, the second mean vector with a second candidate vector of the plurality of second candidate vectors based on the bias score of the second candidate vector; repeating, with the at least one processor, the modifying of the first mean vector, the replacing of the first mean vector, the modifying of the second mean vector, and the replacing of the second mean vector until an extremum of the bias score is reached; and, in response to reaching the extremum of the bias score, linearly projecting, with the at least one processor, each embedding vector of the plurality of embedding vectors along a direction defined between the first mean vector and the second mean vector to debias the plurality of embedding vectors.

Clause 2: The computer-implemented method of clause 1, wherein the plurality of embedding vectors are vector representations of word embeddings and the neural network model comprises a natural language processing (NLP) model.

Clause 3: The computer-implemented method of clause 1 or 2, wherein the plurality of embedding vectors are vector representations of merchant identity embeddings generated from customer transaction data.

Clause 4: The computer-implemented method of any of clauses 1-3, further comprising modifying, with the at least one processor, a machine learning model of a fraud monitoring system using the plurality of embedding vectors that have been debiased by linearly projecting each embedding vector of the plurality of embedding vectors using the direction defined between the first mean vector and the second mean vector.

Clause 5: The computer-implemented method of any of clauses 1-4, wherein the bias score is calculated from a Word Embedding Association Test (WEAT).

Clause 6: The computer-implemented method of any of clauses 1-5, wherein the bias score is calculated from an Embedding Coherence Test (ECT).

Clause 7: The computer-implemented method of any of clauses 1-6, further comprising, before modifying the first mean vector and the second mean vector, determining, with the at least one processor, an initial bias score by linearly projecting the embedding vectors of both the first cluster and the second cluster along an initial direction defined between the first mean vector and the second mean vector, wherein: the replacing of the first mean vector with the first candidate vector of the plurality of first candidate vectors is based on maximizing a difference between the initial bias score and the bias score of the first candidate vector; and the replacing of the second mean vector with the second candidate vector of the plurality of second candidate vectors is based on maximizing a difference between the initial bias score and the bias score of the second candidate vector.

Clause 8: A system comprising a server comprising at least one processor, the server programmed or configured to: receive a plurality of embedding vectors from a neural network model; generate two clusters of embedding vectors based on the plurality of embedding vectors, the two clusters comprising a first cluster of embedding vectors expected to be biased in a first direction and a second cluster expected to be biased in a second direction; determine a first mean vector of the first cluster of embedding vectors and a second mean vector of the second cluster of embedding vectors; modify the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector; replace the first mean vector with a first candidate vector of the plurality of first candidate vectors based on the bias score of the first candidate vector; modify the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine a bias score associated with each second candidate vector; replace the second mean vector with a second candidate vector of the plurality of second candidate vectors based on the bias score of the second candidate vector; repeat the modifying of the first mean vector, the replacing of the first mean vector, the modifying of the second mean vector, and the replacing of the second mean vector until an extremum of the bias score is reached; and in response to reaching the extremum of the bias score, linearly project each embedding vector of the plurality of embedding vectors along a direction defined between the first mean vector and the second mean vector to debias the plurality of embedding vectors.

Clause 9: The system of clause 8, wherein the plurality of embedding vectors are vector representations of word embeddings and the neural network model comprises a natural language processing (NLP) model.

Clause 10: The system of clause 8 or 9, wherein the plurality of embedding vectors are vector representations of merchant identity embeddings generated from customer transaction data.

Clause 11: The system of any of clauses 8-10, wherein the server is further programmed or configured to modify a machine learning model of a fraud monitoring system using the plurality of embedding vectors that have been debiased by linearly projecting each embedding vector of the plurality of embedding vectors using the direction defined between the first mean vector and the second mean vector.

Clause 12: The system of any one of clauses 8-11, wherein the bias score is calculated from a Word Embedding Association Test (WEAT).

Clause 13: The system of any of clauses 8-12, wherein the bias score is calculated from an Embedding Coherence Test (ECT).

Clause 14: The system of any of clauses 8-13, wherein the server is further programmed or configured to, before modifying the first mean vector and the second mean vector, determine an initial bias score by linearly projecting the embedding vectors of both the first cluster and the second cluster along an initial direction defined between the first mean vector and the second mean vector, and wherein: the replacing of the first mean vector with the first candidate vector of the plurality of first candidate vectors is based on maximizing a difference between the initial bias score and the bias score of the first candidate vector; and the replacing of the second mean vector with the second candidate vector of the plurality of second candidate vectors is based on maximizing a difference between the initial bias score and the bias score of the second candidate vector.

Clause 15: A computer program product comprising at least one non-transitory computer-readable medium including program instructions that, when executed by at least one processor, cause the at least one processor to: receive a plurality of embedding vectors from a neural network model; generate two clusters of embedding vectors based on the plurality of embedding vectors, the two clusters comprising a first cluster of embedding vectors expected to be biased in a first direction and a second cluster expected to be biased in a second direction; determine a first mean vector of the first cluster of embedding vectors and a second mean vector of the second cluster of embedding vectors; modify the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector; replace the first mean vector with a first candidate vector of the plurality of first candidate vectors based on the bias score of the first candidate vector; modify the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine a bias score associated with each second candidate vector; replace the second mean vector with a second candidate vector of the plurality of second candidate vectors based on the bias score of the second candidate vector; repeat the modifying of the first mean vector, the replacing of the first mean vector, the modifying of the second mean vector, and the replacing of the second mean vector until an extremum of the bias score is reached; and in response to reaching the extremum of the bias score, linearly project each embedding vector of the plurality of embedding vectors along a direction defined between the first mean vector and the second mean vector to debias the plurality of embedding vectors.

Clause 16: The computer program product of clause 15, wherein the plurality of embedding vectors are vector representations of word embeddings and the neural network model comprises a natural language processing (NLP) model.

Clause 17: The computer program product of clause 15 or 16, wherein the plurality of embedding vectors are vector representations of merchant identity embeddings generated from customer transaction data, and wherein the instructions, when executed by at least one processor, further cause the at least one processor to modify a machine learning model of a fraud monitoring system using the plurality of embedding vectors that have been debiased by linearly projecting each embedding vector of the plurality of embedding vectors using the direction defined between the first mean vector and the second mean vector.

Clause 18: The computer program product of any of clauses 15-17, wherein the bias score is calculated from a Word Embedding Association Test (WEAT).

Clause 19: The computer program product of any of clauses 15-18, wherein the bias score is calculated from an Embedding Coherence Test (ECT).

Clause 20: The computer program product of any of clauses 15-19, wherein the instructions, when executed by at least one processor, further cause the at least one processor to, before modifying the first mean vector and the second mean vector, determine an initial bias score by linearly projecting the embedding vectors of both the first cluster and the second cluster along an initial direction defined between the first mean vector and the second mean vector, and wherein: the replacing of the first mean vector with the first candidate vector of the plurality of first candidate vectors is based on maximizing a difference between the initial bias score and the bias score of the first candidate vector; and the replacing of the second mean vector with the second candidate vector of the plurality of second candidate vectors is based on maximizing a difference between the initial bias score and the bias score of the second candidate vector.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

Additional advantages and details of the present disclosure are explained in greater detail below with reference to the exemplary embodiments or aspects that are illustrated in the accompanying schematic figures, in which:

FIG. 1 is a diagram of a system for debiasing embedding vectors of machine learning models, according to some non-limiting embodiments or aspects;

FIG. 3 is a flow diagram of a method for debiasing embedding vectors of machine learning models, according to some non-limiting embodiments or aspects;

Figure 2:
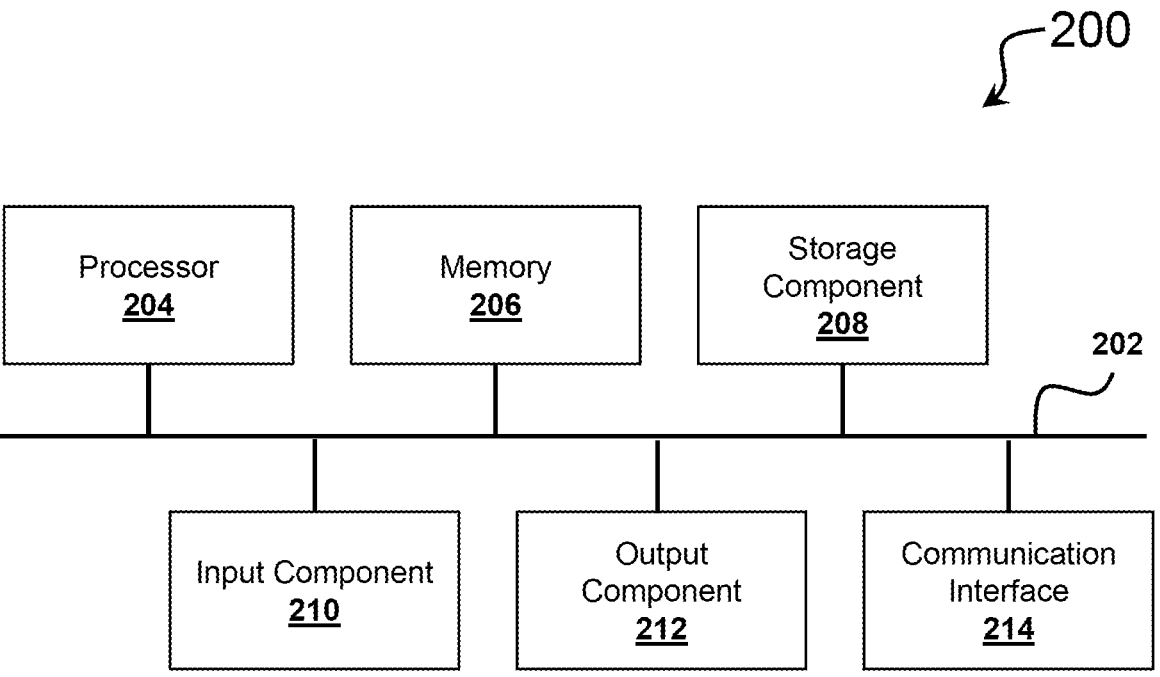
FIG. 2 illustrates example components of a device or system used in connection with non-limiting embodiments or aspects.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments or aspects.

The terms "comprises", "includes" "comprising", "including" or any other variations thereof, are intended to cover a non-exclusive inclusion, such that a setup, device, or method that comprises a list of components or steps does not include only those components or steps but may include other components or steps not expressly listed or inherent to such setup, device, or method. In other words, one or more elements in a system or apparatus proceeded by "comprises . . . a" or "includes . . . a" does not, without more constraints, preclude the existence of other elements or additional elements in the system or apparatus.

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet, and/or the like) that includes data. Any known electronic communication protocols and/or algorithms may be used, such as, for example, Transmission Control Protocol/Internet Protocol (TCP/IP) (including Hypertext Transfer Protocol (HTTP) and other protocols), wireless local area network (WLAN) (including 802.11 and other radio frequency-based protocols and methods), analog transmissions, cellular networks (e.g., Global System for Mobile Communications (GSM®), Code-Division Multiple Access (CDMA), Long-Term Evolution (LTE®), Worldwide Interoperability for Microwave Access (WiMAX®), a third generation (3G) network, a fourth generation (4G) network, a fifth generation (5G) network, etc.), and/or the like. It will be appreciated that numerous other arrangements are possible.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, a radio-frequency identification (RFID) transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications, a token service executing one or more software applications, and/or the like. A transaction processing server may include one or more processors and, in some non-limiting embodiments or aspects, may be operated by or on behalf of a transaction service provider.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a payment device, such as a physical payment instrument, e.g., a payment card, and/or may be electronic and used for electronic payments. The term "issuer system" refers to one or more computer systems operated by or on behalf of an issuer institution, such as a server computer executing one or more software applications. For example, an issuer system may include one or more authorization servers for authorizing a transaction.

As used herein, the term "acquirer institution" may refer to an entity licensed and/or approved by the transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a bank. As used herein, the term "acquirer system" may refer to one or more computer systems, computer devices, software applications, and/or the like operated by or on behalf of an acquirer institution.

As used herein, the terms "authenticating system" and "authentication system" may refer to one or more computing devices that authenticate a user and/or an account, such as, but not limited to, a transaction processing system, merchant system, issuer system, payment gateway, a third-party authenticating service, and/or the like.

As used herein, the terms "request," "response," "request message," and "response message" may refer to one or more messages, data packets, signals, and/or data structures used to communicate data between two or more components or units.

As used herein, the term "account identifier" may include one or more PANs, tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases and/or the like) such that they may be used to conduct a transaction without directly using the original account identifier. In some examples, an original account identifier, such as a PAN, may be associated with a plurality of tokens for different individuals or purposes.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, "merchant system" may refer to one or more computer systems operated by or on behalf of a merchant, such as a server executing one or more software applications. As used herein, the term "product" may refer to one or more goods and/or services offered by a merchant.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "computing device" may refer to one or more electronic devices that are configured to directly or indirectly communicate with or over one or more networks. A computing device may be a mobile device, a desktop computer, and/or any other like device. Furthermore, the term "computer" may refer to any computing device that includes the necessary components to receive, process, and output data, and normally includes a display, a processor, a memory, an input device, and a network interface. As used herein, the term "server" may refer to or include one or more processors or computers, storage devices, or similar computer arrangements that are operated by or facilitate communication and/or processing in a network environment, such as the Internet, although it will be appreciated that communication may be facilitated over one or more public or private network environments and that various other arrangements are possible. Further, multiple computers, e.g., servers, or other computerized devices, such as POS devices, directly or indirectly communicating in the network environment may constitute a "system," such as a merchant's POS system.

The term "processor," as used herein, may represent any type of processing unit, such as a single processor having one or more cores, one or more cores of one or more processors, multiple processors each having one or more cores, and/or other arrangements and combinations of processing units.

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

As used herein, "embedding vector" may refer to a relatively low-dimensional vector representation of relatively higher-dimensional vectors. For example, an embedding vector may represent a mapping of the higher-dimensional vector (e.g., representing a discrete and/or categorical variable, a high-dimensional data record, and/or the like) into a lower-dimensional space. In some non-limiting embodiments or aspects, an embedding vector may include a vector of continuous elements (e.g., numbers) used to represent a discrete variable (e.g., a categorical variable and/or the like) for use in machine learning models (e.g., deep learning models, neural network models, and/or the like). For example, embedding vectors may include multi-dimensional, learned, continuous vector representations of discrete variables that may reduce the dimensionality of categorical variables and meaningfully represent categories in the transformed space. In some non-limiting embodiments or aspects, embedding vectors may simplify machine learning on large inputs, such as sparse vectors representing words. For example, an embedding vector may capture semantics of an input (e.g., a word from a corpus of documents) by placing semantically similar inputs close together in the embedding space. In some non-limiting embodiments or aspects, an embedding vector may be learned and reused across models. In some non-limiting embodiments or aspects, an embedding vector may include a vector representation of a data string (e.g., a word, a merchant identifier (e.g., name, identification number, etc.)) based on the string's distributions in a corpus of data (e.g., a set of documents (e.g., books and/or the like), consumer transaction data (e.g., a series of merchant identifiers that each consumer account of a set of accounts transacted with and/or the like), etc.).

Non-limiting embodiments or aspects of the present disclosure are directed to a system, method, and computer program product for debiasing embedding vectors of neural network machine learning models. It will be appreciated that described systems and methods improve the accuracy and efficiency of computer-driven, decision-making systems by reducing and/or removing bias from embedding vectors in machine learning models. Because embedding vectors may similarly represent input variables having similar semantic values, and because bias may be amplified in embedding vectors, the removal of bias allows a machine learning model to detect semantic similarity resulting from other feature dimensions besides a source of bias. For example, semantic similarities that otherwise would have been detected but are not identified because of obfuscation due to bias may cause a decision-making system to not trigger a computer process when it should (e.g., false negative). Additionally or alternatively, semantic similarities that are detected but would not be identified if bias were removed may cause a decision-making system to trigger a computer process when it should not (e.g., false positive). For decision-making systems making a number of decisions to execute or not execute computer processes every second (e.g., fraud monitoring system), the reduction of false negatives and false positives conserves computer resources (e.g., processing bandwidth, storage space, number of communications, etc.).

Referring now to FIG. 1, illustrated is a diagram of an example system 100 for debiasing embedding vectors of machine learning models. As shown in FIG. 1, system 100 may include user device 102, modeling system 104, fraud monitoring system 106, decision-making system 108, and communication network 110. Each of the foregoing devices and/or systems may include one or more computing devices configured to communicate (e.g., directly and/or indirectly via communication network 110) with other devices and/or systems in system 100.

User device 102 may include a computing device configured with a display for visually representing embedding vectors before, during, and/or after debiasing.

Modeling system 104 may include one or more computing devices (e.g., servers and/or the like) programmed or configured to receive embedding vectors and execute one or more debiasing processes according to methods described herein. In some non-limiting embodiments or aspects, modeling system 104 and user device 102 may be implemented within a single device (e.g., user device 102 may include (e.g., completely, partially, and/or the like) modeling system 104).

Fraud monitoring system 106 may include one or more computing devices (e.g., servers and/or the like) programmed or configured to receive embedding vectors for use in machine learning models to detect fraud and/or execute one or more fraud-mitigation actions (e.g., freezing accounts, declining transactions, transmitting alerts, etc.).

Decision-making system 108 may include one or more servers programmed or configured to receive embedding vectors for use in machine learning models to make one or more computer-driven decisions (e.g., execute computer processes, stop executing computer processes, store data, modify data, transmit data, etc.). In some non-limiting embodiments or aspects, decision-making system 108 may include fraud monitoring system 106.

Communication network 110 may include one or more wired and/or wireless networks. For example, communication network 110 may include a cellular network (e.g., a long-term evolution (LTE®) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network, an ad hoc network, a mesh network, a beacon network, an intranet, the Internet, a fiber optic-based network, a cloud computing network, and/or the like, and/or a combination of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of system 100 may perform one or more functions described as being performed by another set of devices of system 100.

Referring now to FIG. 2, illustrated is a diagram of example components of a device 200. Device 200 may correspond to one or more devices of user device 102, modeling system 104, fraud monitoring system 106, decision-making system 108, and/or a communication network 110. In some non-limiting embodiments or aspects, one or more devices of the foregoing may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage device (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touchscreen display, a keyboard, a keypad, a mouse, a button, a switch, a microphone, a camera, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 206 and/or storage component 208 may include data storage or one or more data structures (e.g., a database, and/or the like). Device 200 may be capable of receiving information from, storing information in, communicating information to, or searching information stored in the data storage or one or more data structures in memory 206 and/or storage component 208. For example, the information may include encryption data, input data, output data, transaction data, account data, or any combination thereof.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Referring now to FIG. 3, illustrated is a flow diagram of a method 300 for debiasing embedding vectors of at least one machine learning model (e.g., at least one neural network model and/or the like). One or more steps of method 300 may be executed by one or more processors of modeling system 104. Additionally or alternatively, one or more steps of method 300 may be executed (e.g., completely, partially, and/or the like) by another system, another device, another group of systems, or another group of devices, separate from or including modeling system 104, such as user device 102, fraud monitoring system 106, decision-making system 108, and/or the like. Each step of method 300 may be performed by a same or different processor.

In step 302, a plurality of embedding vectors may be received. For example, modeling system 104 may receive a plurality of embedding vectors from a neural network model.

In some non-limiting embodiments or aspects, the embedding vectors may include vector representations of word embeddings, and/or the neural network model may include a natural language processing (NLP) model. For example, a category of bias for word embeddings may include gender-association of words that are not inherently gendered.

In some non-limiting embodiments or aspects, the plurality of embedding vectors may be vector representations of merchant identity embeddings generated from customer transaction data. For example, a category of bias for merchant identity embeddings may include location of merchants (e.g., merchants may be associated based on location even if such merchants are not inherently related by type (e.g., merchant category code (MCC) and/or the like)).

In step 304, at least two clusters may be generated. For example, modeling system 104 may generate two clusters of embedding vectors based on the plurality of embedding vectors.

In some non-limiting embodiments, the two clusters may include a first cluster of embedding vectors expected to be biased in a first direction (e.g., male-oriented gender bias, first location bias, etc.) and/or a second cluster of embedding vectors expected to be biased in a second direction (e.g., female-oriented gender bias, second location bias, etc.). The direction of bias may be bipolar, and the clusters may be determined based on groups according to one pole of the bias or another. The two clusters may be generated by selecting embedding vectors representing known or statistically biased input variables. Additionally or alternatively, the two clusters may be generated by selecting groups of nearby embedding vectors, as determined visually in an interface or mathematically.

In step 306, a first mean vector of the first cluster and/or a second mean vector of the second cluster may be determined. For example, modeling system 104 may determine a first mean vector of the first cluster of embedding vectors and a second mean vector of the second cluster of embedding vectors.

In some non-limiting embodiments or aspects, a two-means approach may be used (e.g., by modeling system 104) to determine the first mean vector and the second mean vector, e.g., a center vector of each cluster may be determined. The two-means method, for any two groups of words, may return the normalized vector of their respective averages. For example, for groups of embedding vectors $s_i \in S$ and $m_i \in M$, modeling system 104 may compute a first mean vector as shown in the following equation:

$$s = \frac{1}{|S|} \sum_i s_i$$

Additionally or alternatively, modeling system 104 may compute a second mean vector as shown in the following equation:

$$m = \frac{1}{|M|} \sum_i m_i$$

From the above mean vectors, an initial direction may be calculated as shown in the following equation:

$$v = \frac{s - m}{\|s - m\|}$$

In some non-limiting embodiments or aspects, a user of user device 102 may view a visualization of the embedding vectors (e.g., on the display of user device 102). Additionally or alternatively, the user may provide input to user device 102 to designate another vector within the first cluster as a first mean vector and/or another vector within the second cluster as a second mean vector.

In some non-limiting embodiments or aspects, modeling system 104 may determine a convex combination of the first cluster as a first mean vector and/or a convex combination of the second cluster as a second mean vector.

In some non-limiting embodiments or aspects, modeling system 104 may determine an initial (e.g., baseline) bias score (e.g., a value of a bias test statistic) of the plurality of embedding vectors. For example, the bias score may be calculated (e.g., by modeling system 104) from one or more bias test statistics, including, but not limited to, a Word Embedding Association Test (WEAT), an Embedding Coherence Test (ECT), and/or the like. Additionally or alternatively, modeling system 104 may compare the plurality of embedding vectors to embedding vectors representing known biased variables to determine an association (e.g., similarity of bias) between the groups of vectors.

In some non-limiting embodiments or aspects, modeling system 104 may determine a bias score (e.g., a two-means bias score) based on linearly projecting the embedding vectors of both the first cluster and the second cluster along an initial direction defined between the first mean vector and the second mean vector. For example, the bias score may be calculated from one or more bias test statistics, including, but not limited to, a WEAT, an ECT, and/or the like. Additionally or alternatively, modeling system 104 may determine a difference between the bias score (e.g., two-means bias score) and the initial bias score.

In step 308, the first mean vector may be modified by moving the first mean vector toward each vector of the first cluster. For example, modeling system 104 may modify the first mean vector by moving the first mean vector toward each embedding vector of the first cluster to provide a plurality of first candidate vectors, and by linearly projecting the embedding vectors of both the first cluster and the second cluster along a first direction defined between the second mean vector and each first candidate vector to determine a bias score associated with each first candidate vector.

In some non-limiting embodiments or aspects, moving the first mean vector toward each respective vector in the first cluster may comprise identifying a convex combination of the first mean vector and the respective vector resulting in an improvement in the bias score. Additionally or alternatively, the moving of the first mean vector may include using Golden Section Search (GSS) to optimize an improvement in the bias score by evaluating candidate vectors (e.g., convex combinations of the first mean vector and respective embedding vectors of the first cluster).

In step 310, the first mean vector may be replaced with a first candidate vector based on the bias score of the first candidate vector. For example, modeling system 104 may replace the first mean vector with a first candidate vector of the plurality of first candidate vectors based on the bias score of the first candidate vector.

In some non-limiting embodiments or aspects, modeling system 104 may prioritize identifying a first candidate vector having a local extremum of value of the bias score (e.g., a lower WEAT score, a higher ECT score, etc.). Additionally or alternatively, modeling system 104 may replace the first mean vector with the first candidate vector of the plurality of first candidate vectors based on maximizing a difference between the initial bias score and the bias score of the first candidate vector (e.g., a greatest decrease in WEAT score, a greatest increase in ECT score, etc.). The chosen first candidate vector may become the new first mean vector.

In step 312, the second mean vector may be modified by moving the second mean vector toward each vector of the second cluster. For example, modeling system 104 may modify the second mean vector by moving the second mean vector toward each embedding vector of the second cluster to provide a plurality of second candidate vectors, and by linearly projecting the embedding vectors of both the first cluster and the second cluster along a second direction defined between the first mean vector and each second candidate vector to determine a bias score associated with each second candidate vector.

In some non-limiting embodiments or aspects, moving the second mean vector toward each respective vector in the second cluster may comprise identifying a convex combination of the second mean vector and the respective vector resulting in an improvement in the bias score. Additionally or alternatively, the moving of the second mean vector may include using GSS to optimize an improvement in the bias score by evaluating candidate vectors (e.g., convex combinations of the second mean vector and respective embedding vectors of the second cluster).

In step 314, the second mean vector may be replaced with a second candidate vector based on the bias score of the second candidate vector. For example, modeling system 104 may replace the second mean vector with a second candidate vector of the plurality of second candidate vectors based on the bias score of the second candidate vector.

In some non-limiting embodiments or aspects, modeling system 104 may prioritize identifying a second candidate vector having a local extremum of value of the bias score (e.g., a lower WEAT score, a higher ECT score, etc.). Additionally or alternatively, modeling system 104 may replace the second mean vector with the second candidate vector of the plurality of second candidate vectors based on maximizing a difference between the initial bias score and the bias score of the second candidate vector (e.g., a greatest decrease in WEAT score, a greatest increase in ECT score, etc.).

In some non-limiting embodiments, steps 308, 310, 312, and 314 may be repeated until an extremum of the bias score is reached (e.g., convergence on a maximum or minimum value of a bias test statistic). For example, modeling system 104 may repeat the modifying of the first mean vector in step 308, the replacing of the first mean vector in step 310, the modifying of the second mean vector in step 312, and the replacing of the second mean vector in step 314 until an extremum of the bias score is reached (e.g., a maximum ECT score, a minimum WEAT score, etc.).

In step 316, the plurality of embedding vectors may be linearly projected along a direction defined between the first mean vector and the second mean vector (e.g., after being moved as described above). For example, modeling system 104 may, in response to reaching the extremum of the bias score, linearly project each embedding vector of the plurality of embedding vectors along a direction defined between the first mean vector and the second mean vector to debias the plurality of embedding vectors.

In some non-limiting embodiments or aspects, modeling system 104 may communicate the (debiased) embedding vectors to at least one of fraud monitoring system 106 and/or decision-making system 108.

In some non-limiting embodiments or aspects, decision-making system 108 may use the debiased embedding vectors to modify (e.g., train, retrain, and/or the like) a machine learning model used to execute one or more computer-driven processes.

In some non-limiting embodiments or aspects, for embedding vectors including vector representations of word embeddings generated from document data, a system for natural language processing may modify (e.g., train, retrain, and/or the like) a machine learning model used for text-based search queries, machine translation, and/or the like. Use of the debiased word embeddings may improve the accuracy and efficiency of the search queries and machine translation.

In some non-limiting embodiments or aspects, for embedding vectors including vector representations of merchant identity embeddings generated from customer transaction data, fraud monitoring system 106 may modify (e.g., train, retrain, and/or the like) a machine learning model of fraud monitoring system 106 using the plurality of embedding vectors that have been debiased, so as to further increase the accuracy and efficiency of fraud detection and mitigation.

In some non-limiting embodiments or aspects, for embedding vectors including vector representations of merchant identity embeddings generated from customer transaction data, a recommendation system may modify (e.g., train, retrain, and/or the like) a machine learning model used for making merchant recommendations to users (e.g., in a mobile application, a web browser, in push communications, etc.). Use of the debiased merchant identity embeddings may improve the accuracy and efficiency of the merchant recommendations.

Referring now to FIGS. 4A-4D, illustrated are diagrams of an exemplary implementation of the method shown in FIG. 3. One or more steps of an implementation 400 may be executed by one or more processors of modeling system 104. Additionally or alternatively, one or more steps of implementation 400 may be executed (e.g., completely, partially, and/or the like) by another system, another device, another group of systems, or another group of devices, separate from or including modeling system 104, such as user device 102, fraud monitoring system 106, decision-making system 108, and/or the like. Each step of implementation 400 may be performed by a same or different processor.

Figure 4A:
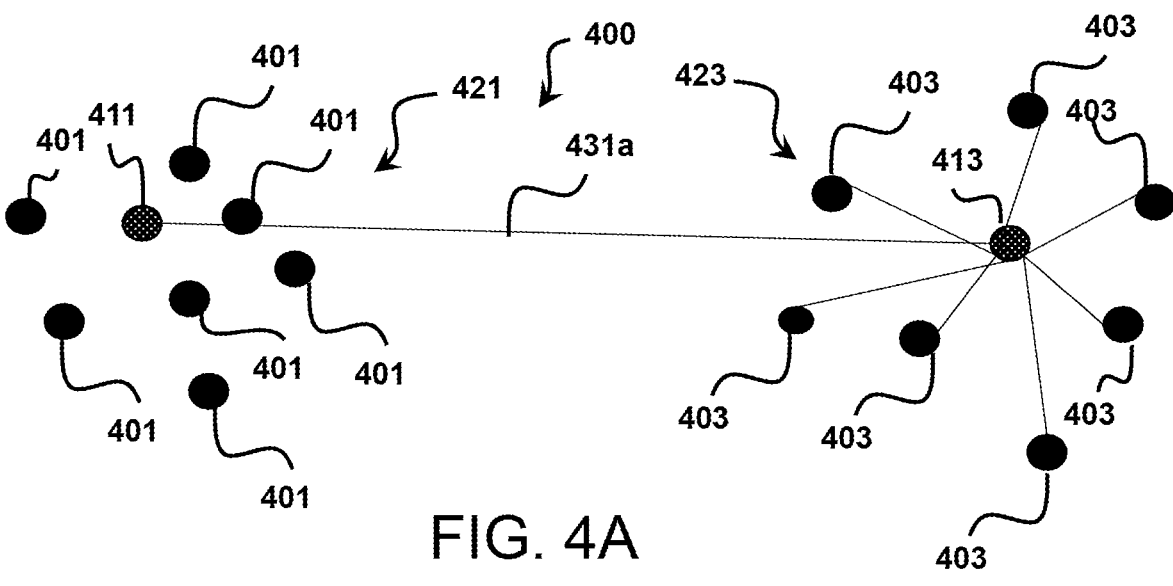
FIGS. 4A-4D are diagrams of an exemplary implementation of the method shown in FIG. 3, according to some non-limiting embodiments or aspects.

As shown in FIG. 4A, in some non-limiting embodiments or aspects, a plurality of embedding vectors 401, 403 may be received. (For clarity, each embedding vector 401, 403 is illustrated as a dot rather than a ray. Each dot may represent the endpoint of the respective vector.) For example, modeling system 104 may receive a plurality of embedding vectors 401, 403, as described herein. Embedding vectors 401, 403 may include first embedding vectors 401 in a first category and second embedding vectors 403 in a second category, as described herein. In some non-limiting embodiments or aspects, the first category and the second category each may be a respective subcategory of a category of bias. For example, the first category may include a first location and the second category may include a second location, and location may be a category of bias for merchant embedding vectors. For example, the first category may include a first gender (e.g., male) and the second category may include a second gender (e.g., female), and gender may be a category of bias for word embedding vectors.

In some non-limiting embodiments or aspects, at least two clusters may be generated. For example, modeling system

104 may generate two clusters 421, 423 based on first embedding vector 401 and second embedding vector 403, as described herein.

In some non-limiting embodiments or aspects, first mean vector 411 of first cluster 421 and/or second mean vector 413 of second cluster 423 may be determined. For example, modeling system 104 may determine first mean vector 411 of first cluster 421 of first embedding vectors 401 and second mean vector 413 of second cluster 423 of second embedding vectors 403, as described herein. In some non-limiting embodiments or aspects, an initial direction 431a may be determined based on first mean vector 411 and second mean vector 413, as described herein.

In some non-limiting embodiments or aspects, second mean vector 413 may be modified by moving second mean vector 413 toward each (second) embedding vector 403 of second cluster 423, as described herein. For example, modeling system 104 may modify second mean vector 413, as described herein.

Figure 4B:
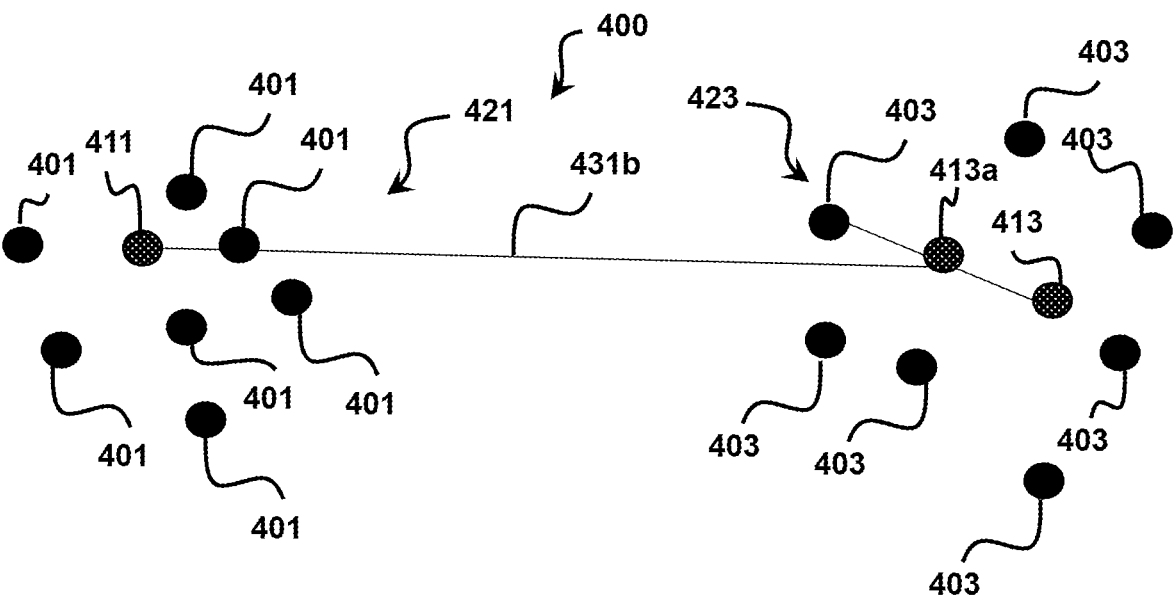

As shown in FIG. 4B, in some non-limiting embodiments or aspects, second mean vector 413 may be replaced with (second) candidate vector 413a based on the bias score of (second) candidate vector 413a, as described herein. For example, modeling system 104 may replace second mean vector 413 with (second) candidate vector 413a of a plurality of (second) candidate vectors based on the bias score of (second) candidate vector 413a, as described herein. In some non-limiting embodiments or aspects, modified direction 431b may be determined based on first mean vector 411 and (second) candidate vector 413a, as described herein.

Figure 4C:
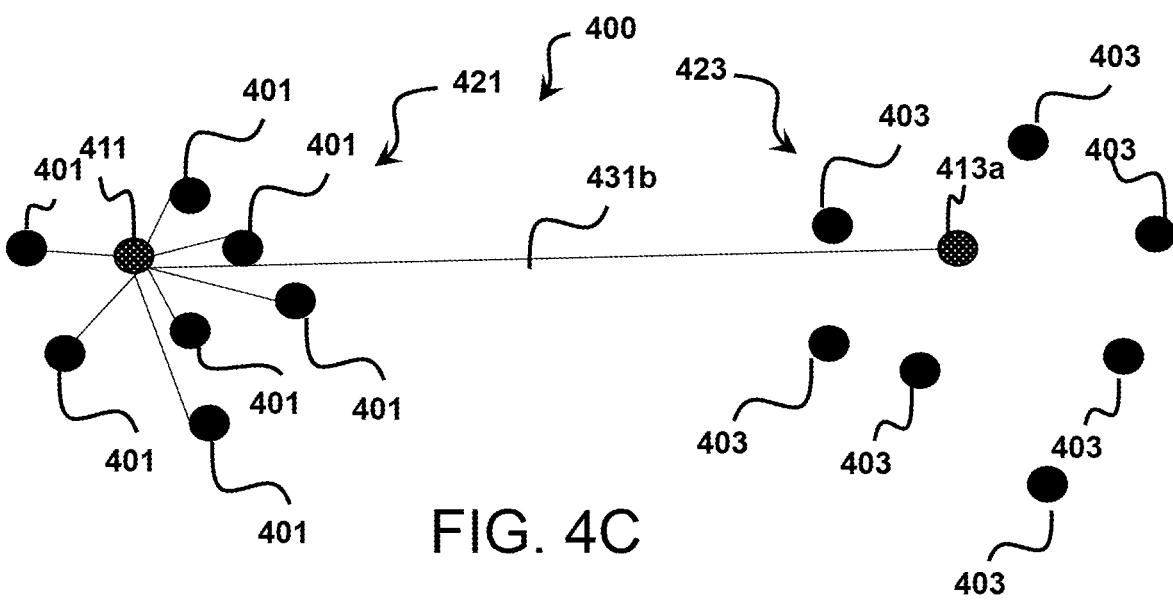

As shown in FIG. 4C, in some non-limiting embodiments or aspects, first mean vector 411 may be modified by moving first mean vector 411 toward each (first) embedding vector 401 of first cluster 421, as described herein. For example, modeling system 104 may modify first mean vector 411, as described herein.

Figure 4D:
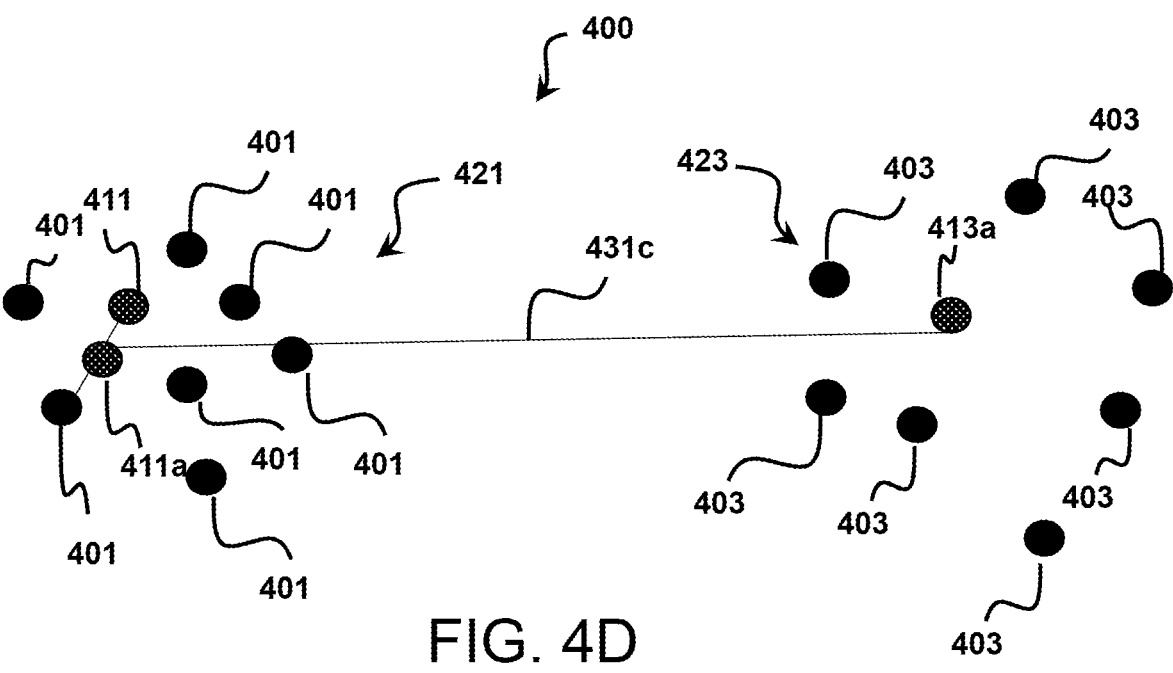

As shown in FIG. 4D, in some non-limiting embodiments or aspects, first mean vector 411 may be replaced with (first) candidate vector 411a based on the bias score of (first) candidate vector 411a, as described herein. For example, modeling system 104 may replace first mean vector 411 with (first) candidate vector 411a of a plurality of (first) candidate vectors based on the bias score of (first) candidate vector 411a, as described herein. In some non-limiting embodiments or aspects, a further modified direction 431c may be determined based on first candidate vector 411a and second candidate vector 413a, as described herein.

In some non-limiting embodiments or aspects, the aforementioned process may be repeated until an extremum of the bias score is reached (e.g., convergence on a maximum or minimum value of a bias test statistic), as described herein.

Figure 5:
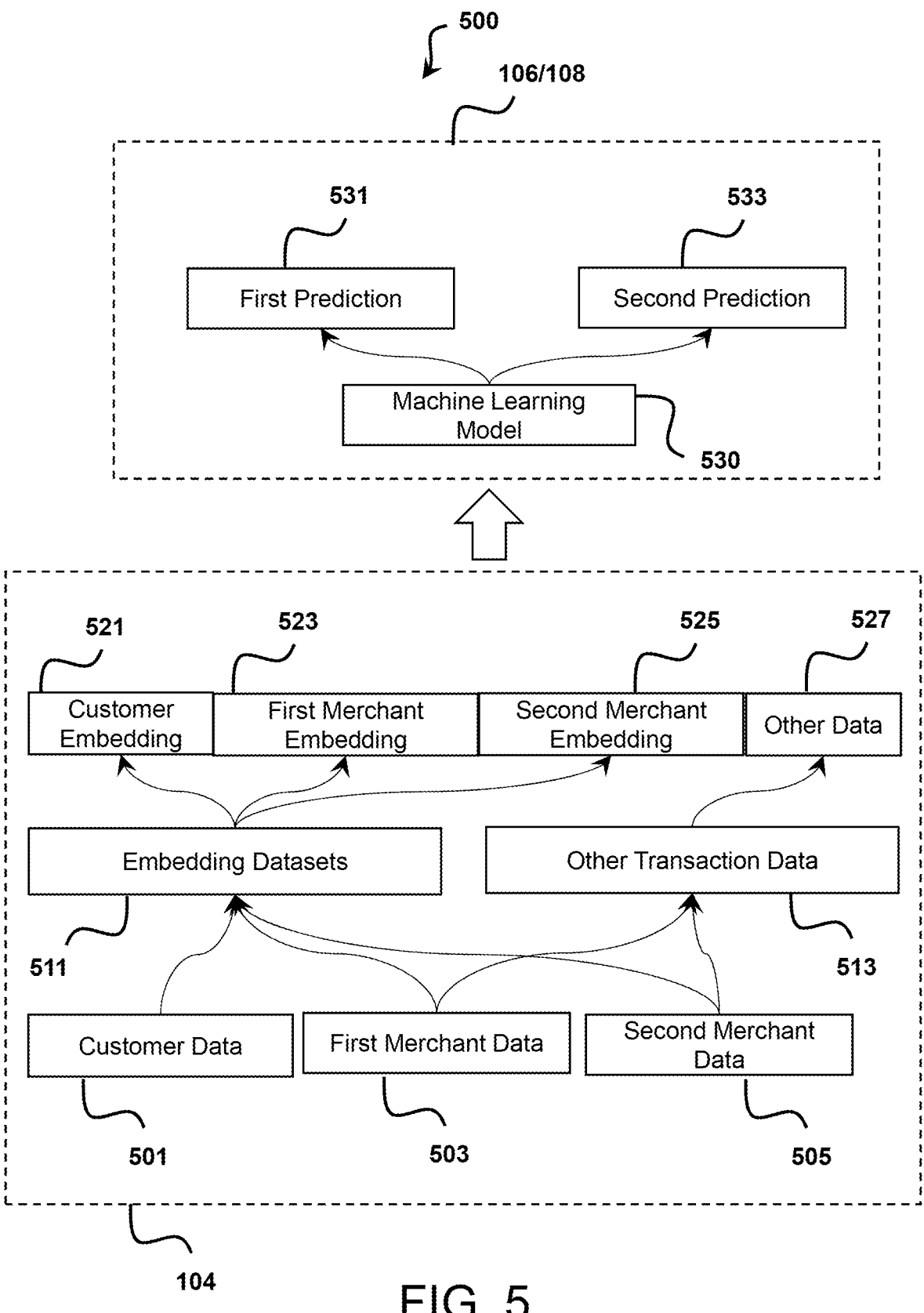
FIG. 5 is a diagram of an exemplary implementation of the method shown in FIG. 3, according to some non-limiting embodiments or aspects.

Referring now to FIG. 5, illustrated is a diagram of an exemplary implementation 500 of the method shown in FIG. 3. As shown in FIG. 5, implementation 500 includes customer data 501, first merchant data 503, second merchant data 505, embedding datasets 511, other transaction data 513, customer embedding vector 521, first merchant embedding vector 523, second merchant embedding vector 525, other data 527, machine learning model 530, first prediction 531, and second prediction 533. In some non-limiting embodiments or aspects, implementation 500 may be implemented (e.g., completely, partially, and/or the like) by modeling system 104. Additionally or alternatively, implementation 500 may be implemented (e.g., completely, partially, and/or the like) by another system, another device, another group of systems, or another group of devices, separate from or including modeling system 104, such as user device 102, fraud monitoring system 106, decision-making system 108, and/or the like. For example, as shown in FIG. 5 for the purpose of illustration and not limitation, implementation 500 may be implemented partially by modeling system 104 and partially by fraud monitoring system 106 and/or decision-making system 108.

In some non-limiting embodiments or aspects, customer data 501 may include transaction data (e.g., payment transaction data associated with a plurality of payment transactions) associated with a customer (e.g., a payment account of the customer). Additionally or alternatively, first merchant data 503 may include transaction data (e.g., payment transaction data associated with a plurality of payment transactions) associated with a first merchant (e.g., a first restaurant and/or the like). Additionally or alternatively, second merchant data 505 may include transaction data (e.g., payment transaction data associated with a plurality of payment transactions) associated with a second merchant (e.g., a second restaurant and/or the like).

In some non-limiting embodiments or aspects, embedding datasets 511 may include data based on customer data 501 (or a portion thereof), first merchant data 503 (or a portion thereof), and/or second merchant data 505 (or a portion thereof). Additionally or alternatively, other transaction data 513 may include data based on customer data 501 (or a portion thereof), first merchant data 503 (or a portion thereof), and/or second merchant data 505 (or a portion thereof).

In some non-limiting embodiments or aspects, customer embedding vector 521, first merchant embedding vector 523, and/or second merchant embedding vector 525 may be generated, e.g., by a neural network model and/or NLP model, as described herein. Additionally or alternatively, at least one of customer embedding vector 521, first merchant embedding vector 523, and/or second merchant embedding vector 525 may be modified (e.g., linearly projected) to remove bias, as described herein.

In some non-limiting embodiments or aspects, customer embedding vector 521, first merchant embedding vector 523, and/or second merchant embedding vector 525 (e.g., after being modified/linearly projected to remove bias, as described herein) may be communicated to and/or inputted to machine learning model 530, as described herein. For example, machine learning model 530 may include a neural network, a deep neural network (DNN) a fraud detection model, a recommendation model (e.g., merchant recommendation model, restaurant recommendation model, product recommendation model, and/or the like), and/or the like.

In some non-limiting embodiments or aspects, customer embedding vector 521, first merchant embedding vector 523, and/or second merchant embedding vector 525 may be combined with (e.g., appended to and/or concatenated with) other data 527 based on other transaction data 513 before or after being communicated to machine learning model 530 (e.g., before being inputted to machine learning model 530).

In some non-limiting embodiments or aspects, machine learning model 530 may be modified (e.g., trained, retrained, and/or the like) based on the embedding vectors (e.g., customer embedding vector 521, first merchant embedding vector 523, and/or second merchant embedding vector 525, each of which may have been modified/linearly projected to remove bias, as described herein). Additionally or alternatively, machine learning model 530 (e.g., after having been trained) may generate at least one prediction based on the embedding vectors (e.g., customer embedding vector 521, first merchant embedding vector 523, and/or second merchant embedding vector 525, each of which may have been modified/linearly projected to remove bias, as described herein). For example, machine learning model 530 may generate first prediction 531 indicating that the customer would likely prefer the first merchant (e.g., first restaurant) and/or second prediction 533 indicating that the customer would likely prefer the second merchant (e.g., second restaurant) based on the embedding vectors.

Figure 6A:
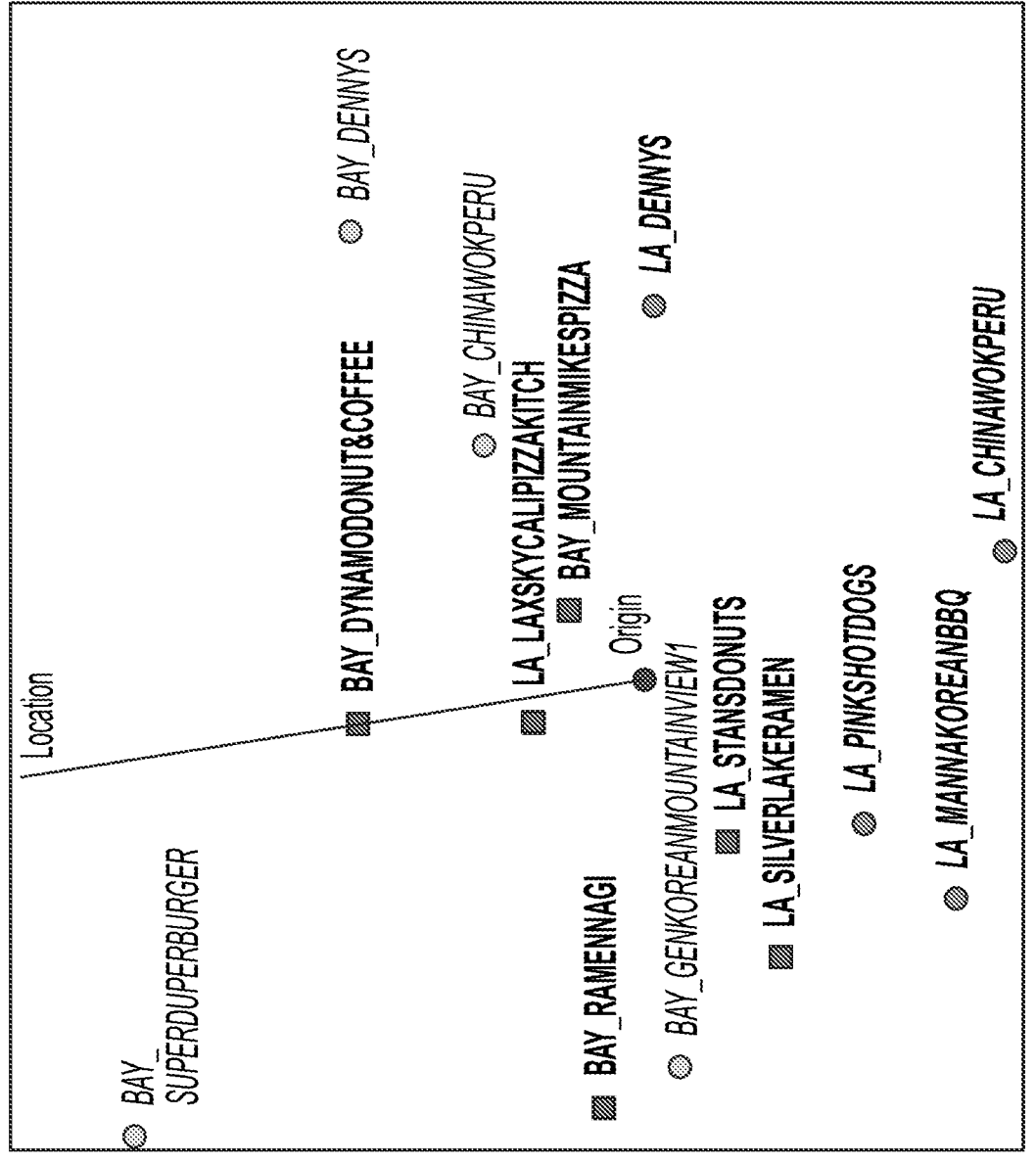
FIGS. 6A-6C are graphical visualizations of exemplary vectors of an exemplary implementation of the process shown in FIG. 3, according to some non-limiting embodiments or aspects.
Figure 6B:
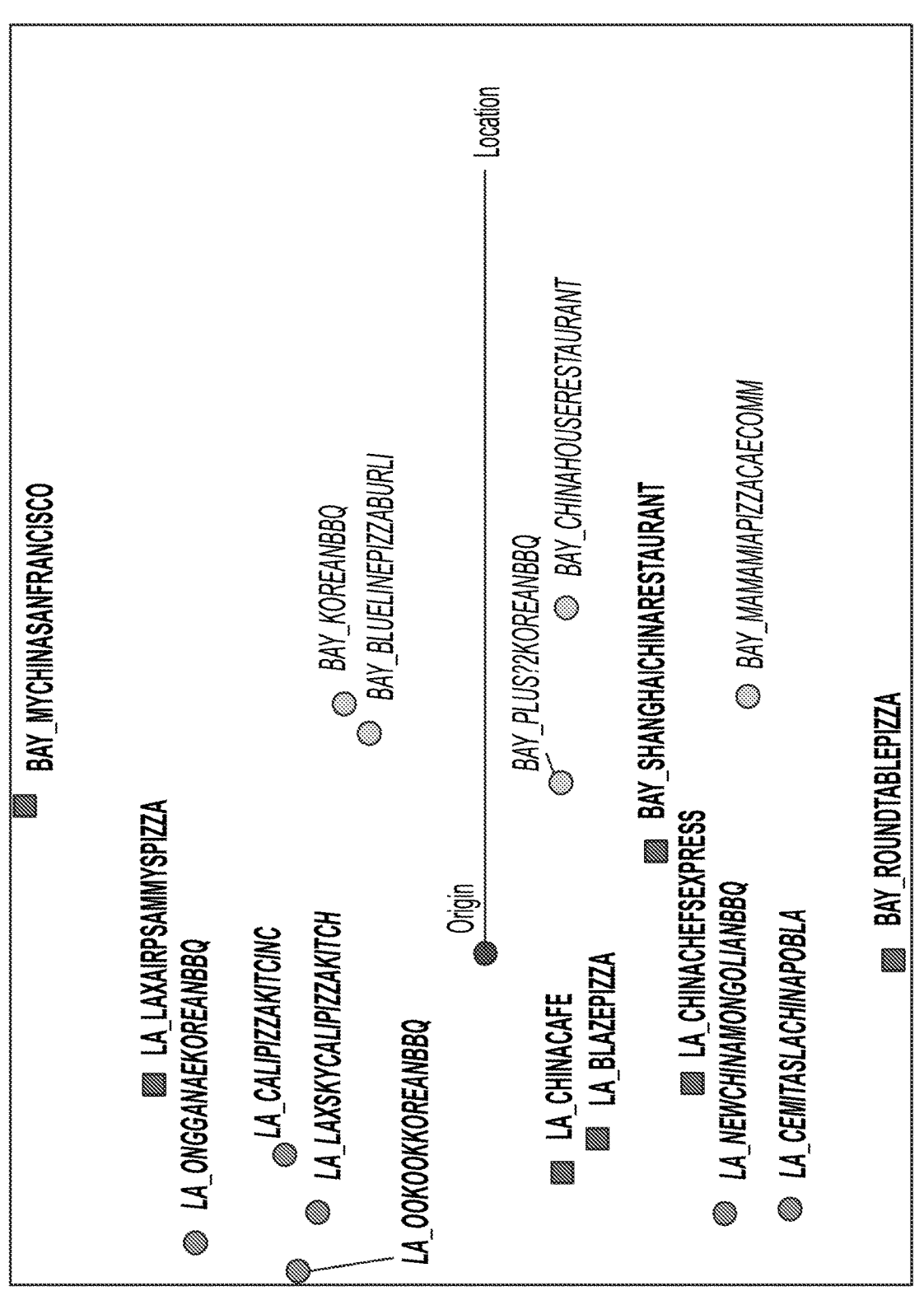
Figure 6C:
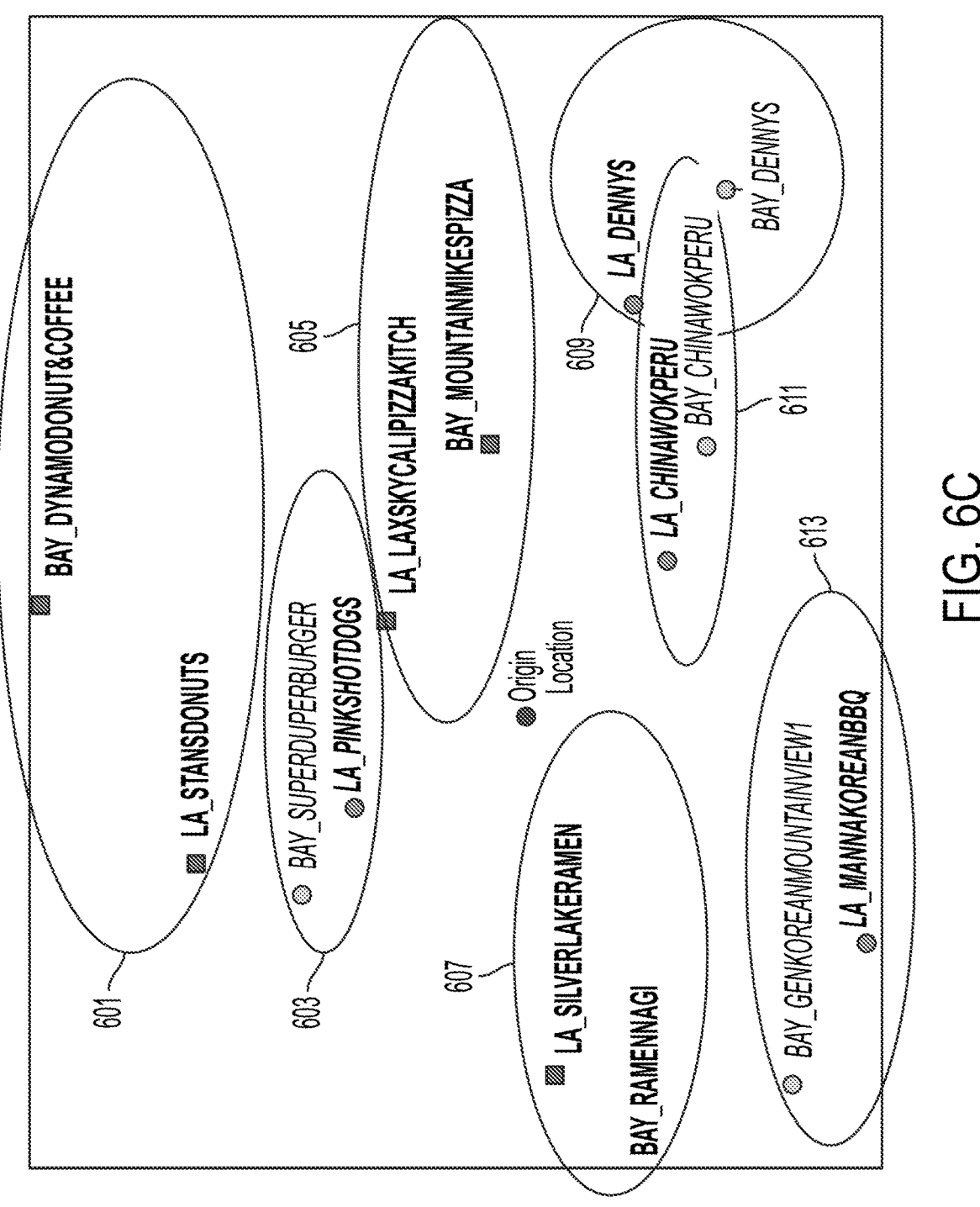

FIGS. 6A-6C are graphical visualizations of exemplary vectors of an exemplary implementation of the process shown in FIG. 3. In each visualization, embedding vectors that have a relatively high number of dimensions (e.g., greater than two dimensions, such as 50 dimensions or more) are projected into two-dimensional space to enable visualizing the embedding vectors. For clarity, each embedding vector is illustrated as a point rather than a ray. Each point may represent the endpoint of the respective vector. Each point is labeled with a location (e.g., "LA" for Los Angeles or "BAY" for Bay Area) and the name of a merchant (e.g., restaurant) represented by the respective embedding vector. Circular points are embedding vectors used for training, and square points are embedding vectors used for evaluation. The direction of bias (e.g., with location as the category of bias) is indicated by the line (labeled "Location") from the origin (e.g., "Origin").

As shown in FIG. 6A, the embedding vectors may be projected into two-dimensional space such that the horizontal and vertical axes of the two-dimensional space are the dimensions with highest variance (e.g., as determined by principal component analysis (PCA)). For the purpose of illustration and not limitation, in this two-dimensional space, the direction of (location) bias from the origin is towards the top and slightly to the left within the visualization. For the purpose of illustration and not limitation, the embedding vectors for merchants in Los Angeles are generally clustered in the bottom portion of the visualization, and the embedding vectors for merchants in the Bay Area are generally clustered in the top portion of the visualization. In some non-limiting embodiments or aspects, each merchant may be a restaurant with a cuisine of one of seven types: Chinese, Ramen, Korean BBQ, Diner, Donuts, Pizza, and Burgers/Hotdogs. However, as shown in FIG. 6A, restaurants having cuisine of the same type are not initially clustered together.

As shown in FIG. 6B, the two-dimensional visualization space may be rotated so that the direction of bias is aligned with the horizontal axis. Additionally or alternatively, the dimension of the (higher-dimensional) embedding vector space with highest variance (e.g., as determined by PCA) may be aligned with the vertical axis. For the purpose of illustration and not limitation, the direction of (location) bias from the origin is straight to the right of the visualization. For the purpose of illustration and not limitation, the embedding vectors for merchants in Los Angeles are generally clustered in the left portion of the visualization, and the embedding vectors for merchants in the Bay Area are generally clustered in the right portion of the visualization. However, as shown in FIG. 6B, restaurants having cuisine of the same type are not initially clustered together.

As shown in FIG. 6C, the embedding vectors are modified/linearly projected to remove bias, as described herein. For the purpose of illustration and not limitation, the (location) bias has been removed (e.g., the label Location now overlaps with the label Origin because there is not direction of bias). Additionally, as shown in FIG. 6C, restaurants having cuisine of the same type are now clustered together. For example, cluster 601 includes two Donuts restaurants, even though they are in different locations (Los Angeles and the Bay Area). Cluster 603 includes two Burgers/Hotdogs restaurants, even though they are in different locations. Cluster 605 includes two Pizza restaurants, even though they are in different locations. Cluster 607 includes two Ramen restaurants, even though they are in different locations. Cluster 609 includes two Diner restaurants, even though they are in different locations. Cluster 611 includes two Chinese restaurants, even though they are in different locations. Cluster 613 includes two Korean BBQ restaurants, even though they are in different locations.

For the purpose of illustration and not limitation, Table 1 shows three bias scores (WEAT, ECT, and Natural Language Inference (NLI)) for the disclosed methodology ("Iterative Subspace") compared to embeddings without any correction for bias ("Baseline") and three different methodologies for removing bias: PCA ("PCA"), two-means ("2-means"), and classification normal ("Classification") for the task of removing gender bias from word embeddings. For ECT and NLI, higher values may be desirable (e.g., less bias), and for WEAT, lower values may be desirable (e.g., less bias). As can be seen from Table 1, the disclosed methodology ("Iterative Subspace") outperforms the other methodologies for removing bias.

TABLE 1

| Method | ECT (occ) | WEAT (adj) | NLI Test |
|---|---|---|---|
| Baseline | 0.773 | 1.587 | 0.297 |
| PCA | 0.905 | 1.17 | 0.346 |
| 2-means | 0.912 | 1.102 | 0.379 |
| Classification (1 step) | 0.872 | 0.951 | 0.383 |
| Iterative Subspace | 0.966 | 0.902 | 0.386 |

Figure 7:
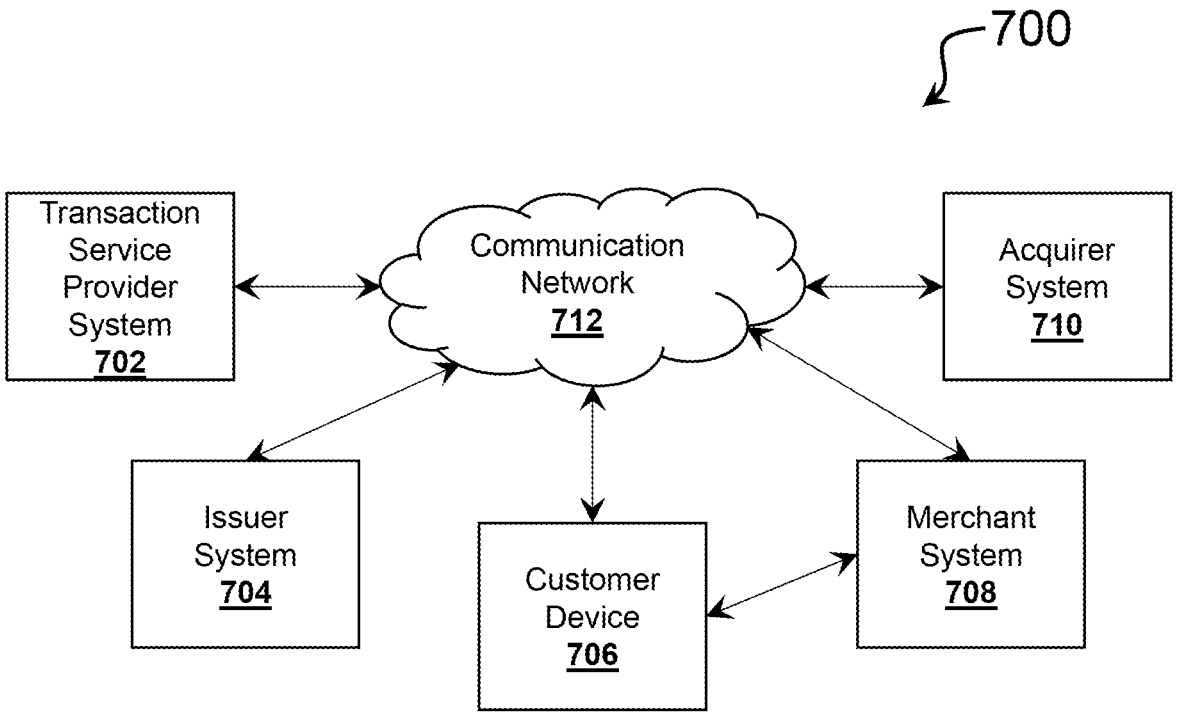
FIG. 7 is a diagram of an exemplary environment in which methods, systems, and/or computer program products, described herein, may be implemented, according to some non-limiting embodiments or aspects.

Referring now to FIG. 7, FIG. 7 is a diagram of an exemplary environment 700 in which systems, products, and/or methods, as described herein, may be implemented, according to non-limiting embodiments or aspects of the presently disclosed subject matter. As shown in FIG. 7, environment 700 includes transaction service provider system 702, issuer system 704, customer device 706, merchant system 708, acquirer system 710, and communication network 712. In some non-limiting embodiments or aspects, at least one of (e.g., all of) user device 102, modeling system 104, fraud monitoring system 106, and/or decision-making system 108 may be the same as, similar to, and/or part of transaction service provider system 702. In some non-limiting embodiments or aspects, at least one of user device 102, modeling system 104, fraud monitoring system 106, and/or decision-making system 108 may be the same as, similar to, and/or part of another system, another device, another group of systems, or another group of devices, separate from or including transaction service provider system 702, such as issuer system 704, customer device 706, merchant system 708, acquirer system 710, and/or the like. For example, transaction service provider system 702 may include each of modeling system 104, fraud monitoring system 106, and decision-making system 108, and at least one of issuer system 704, customer device 706, merchant system 708, and/or acquirer system 710 may include user device 102. Additionally or alternatively, transaction service provider system 702 may include modeling system 104, and at least one of issuer system 704, customer device 706, merchant system 708, and/or acquirer system 710 may include one or more of user device 102, fraud monitoring system 106, and/or decision-making system 108. Additionally or alternatively, transaction service provider system 702 may include modeling system 104 and fraud monitoring system 106, and at least one of issuer system 704, customer device 706, merchant system 708, and/or acquirer system 710 may include one or more of user device 102 and/or decision-making system 108.

Transaction service provider system 702 may include one or more devices capable of receiving information from and/or communicating information to issuer system 704, customer device 706, merchant system 708, and/or acquirer system 710 via communication network 712. For example, transaction service provider system 702 may include a computing device, such as a server (e.g., a transaction processing server), a group of servers, and/or other like devices. In some non-limiting embodiments or aspects, transaction service provider system 702 may be associated with a transaction service provider as described herein. In some non-limiting embodiments or aspects, transaction service provider system 702 may be in communication with a data storage device, which may be local or remote to transaction service provider system 702. In some non-limiting embodiments or aspects, transaction service provider system 702 may be capable of receiving information from, storing information in, communicating information to, or searching information stored in the data storage device.

Issuer system 704 may include one or more devices capable of receiving information and/or communicating information to transaction service provider system 702, customer device 706, merchant system 708, and/or acquirer system 710 via communication network 712. For example, issuer system 704 may include a computing device, such as a server, a group of servers, and/or other like devices. In some non-limiting embodiments or aspects, issuer system 704 may be associated with an issuer institution as described herein. For example, issuer system 704 may be associated with an issuer institution that issued a credit account, debit account, credit card, debit card, and/or the like to a user associated with customer device 706.

Customer device 706 may include one or more devices capable of receiving information from and/or communicating information to transaction service provider system 702, issuer system 704, merchant system 708, and/or acquirer system 710 via communication network 712. Additionally or alternatively, each customer device 706 may include a device capable of receiving information from and/or communicating information to other user devices 706 via communication network 712, another network (e.g., an ad hoc network, a local network, a private network, a virtual private network, and/or the like), and/or any other suitable communication technique. For example, customer device 706 may include a client device and/or the like. In some non-limiting embodiments or aspects, customer device 706 may or may not be capable of receiving information (e.g., from merchant system 708 or from another customer device 706) via a short-range wireless communication connection (e.g., an NFC communication connection, an RFID communication connection, a Bluetooth® communication connection, a Zigbee® communication connection, and/or the like), and/or communicating information (e.g., to merchant system 708) via a short-range wireless communication connection.

Merchant system 708 may include one or more devices capable of receiving information from and/or communicating information to transaction service provider system 702, issuer system 704, customer device 706, and/or acquirer system 710 via communication network 712. Merchant system 708 may also include a device capable of receiving information from customer device 706 via communication network 712, a communication connection (e.g., an NFC communication connection, an RFID communication connection, a Bluetooth® communication connection, a Zigbee® communication connection, and/or the like) with customer device 706, and/or the like, and/or communicating information to customer device 706 via communication network 712, the communication connection, and/or the like. In some non-limiting embodiments or aspects, merchant system 708 may include a computing device, such as a server, a group of servers, a client device, a group of client devices, and/or other like devices. In some non-limiting embodiments or aspects, merchant system 708 may be associated with a merchant, as described herein. In some non-limiting embodiments or aspects, merchant system 708 may include one or more client devices. For example, merchant system 708 may include a client device that allows a merchant to communicate information to transaction service provider system 702. In some non-limiting embodiments or aspects, merchant system 708 may include one or more devices, such as computers, computer systems, and/or peripheral devices capable of being used by a merchant to conduct a transaction with a user. For example, merchant system 708 may include a POS device and/or a POS system.

Acquirer system 710 may include one or more devices capable of receiving information from and/or communicating information to transaction service provider system 702, issuer system 704, customer device 706, and/or merchant system 708 via communication network 712. For example, acquirer system 710 may include a computing device, a server, a group of servers, and/or the like. In some non-limiting embodiments or aspects, acquirer system 710 may be associated with an acquirer as described herein.

Communication network 712 may include one or more wired and/or wireless networks. For example, communication network 712 may include a cellular network (e.g., an LTE® network, a 3G network, a 4G network, a 5G network, a CDMA network, and/or the like), a PLMN, LAN, a WAN, a MAN, a telephone network (e.g., the PSTN), a private network (e.g., a private network associated with a transaction service provider), an ad hoc network, an intranet, the Internet, a fiber optic-based network, a cloud computing network, and/or the like, and/or a combination of these or other types of networks.

In some non-limiting embodiments or aspects, processing a transaction may include generating and/or communicating at least one transaction message (e.g., authorization request, authorization response, any combination thereof, and/or the like). For example, a client device (e.g., customer device 706, a POS device of merchant system 708, and/or the like) may initiate the transaction, e.g., by generating an authorization request. Additionally or alternatively, the client device (e.g., customer device 706, at least one device of merchant system 708, and/or the like) may communicate the authorization request. For example, customer device 706 may communicate the authorization request to merchant system 708 and/or a payment gateway (e.g., a payment gateway of transaction service provider system 702, a third-party payment gateway separate from transaction service provider system 702, and/or the like). Additionally or alternatively, merchant system 708 (e.g., a POS device thereof) may communicate the authorization request to acquirer system 710 and/or a payment gateway. In some non-limiting embodiments or aspects, acquirer system 710 and/or a payment gateway may communicate the authorization request to transaction service provider system 702 and/or issuer system 704. Additionally or alternatively, transaction service provider system 702 may communicate the authorization request to issuer system 704. In some non-limiting embodiments or aspects, issuer system 704 may determine an authorization decision (e.g., authorize, decline, and/or the like) based on the authorization request. For example, the authorization request may cause issuer system 704 to determine the authorization decision based thereof. In some non-limiting embodiments or aspects, issue system 704 may generate an authorization response based on the authorization decision. Additionally or alternatively, issuer system 704 may communicate the authorization response. For example, issuer system 704 may communicate the authorization response to transaction service provider system 702 and/or a payment gateway. Additionally or alternatively, transaction service provider system 702 and/or a payment gateway may communicate the authorization response to acquirer system 710, merchant system 708, and/or customer device 706. Additionally or alternatively, acquirer system 710 may communicate the authorization response to merchant system 708 and/or a payment gateway. Additionally or alternatively, a payment gateway may communicate the authorization response to merchant system 708 and/or customer device 706. Additionally or alternatively, merchant system 708 may communicate the authorization response to customer device 706. In some non-limiting embodiments or aspects, merchant system 708 may receive (e.g., from acquirer system 710 and/or a payment gateway) the authorization response. Additionally or alternatively, merchant system 708 may complete the transaction based on the authorization response (e.g., provide, ship, and/or deliver goods and/or services associated with the transaction; fulfill an order associated with the transaction; any combination thereof; and/or the like).

For the purpose of illustration, processing a transaction may include generating a transaction message (e.g., authorization request and/or the like) based on an account identifier of a customer (e.g., associated with customer device 706 and/or the like) and/or transaction data associated with the transaction. For example, merchant system 708 (e.g., a client device of merchant system 708, a POS device of merchant system 708, and/or the like) may initiate the transaction, e.g., by generating an authorization request (e.g., in response to receiving the account identifier from a portable financial device of the customer and/or the like). Additionally or alternatively, merchant system 708 may communicate the authorization request to acquirer system 710. Additionally or alternatively, acquirer system 710 may communicate the authorization request to transaction service provider system 702. Additionally or alternatively, transaction service provider system 702 may communicate the authorization request to issuer system 704. Issuer system 704 may determine an authorization decision (e.g., authorize, decline, and/or the like) based on the authorization request, and/or issuer system 704 may generate an authorization response based on the authorization decision and/or the authorization request. Additionally or alternatively, issuer system 704 may communicate the authorization response to transaction service provider system 702. Additionally or alternatively, transaction service provider system 702 may communicate the authorization response to acquirer system 710, which may communicate the authorization response to merchant system 708.

For the purpose of illustration, clearing and/or settlement of a transaction may include generating a message (e.g., clearing message, settlement message, and/or the like) based on an account identifier of a customer (e.g., associated with customer device 706 and/or the like) and/or transaction data associated with the transaction. For example, merchant system 708 may generate at least one clearing message (e.g., a plurality of clearing messages, a batch of clearing messages, and/or the like). Additionally or alternatively, merchant system 708 may communicate the clearing message(s) to acquirer system 710. Additionally or alternatively, acquirer system 710 may communicate the clearing message(s) to transaction service provider system 702. Additionally or alternatively, transaction service provider system 702 may communicate the clearing message(s) to issuer system 704. Additionally or alternatively, issuer system 704 may generate at least one settlement message based on the clearing message(s). Additionally or alternatively, issuer system 704 may communicate the settlement message(s) and/or funds to transaction service provider system 702 (and/or a settlement bank system associated with transaction service provider system 702). Additionally or alternatively, transaction service provider system 702 (and/or the settlement bank system) may communicate the settlement message(s) and/or funds to acquirer system 710, which may communicate the settlement message(s) and/or funds to merchant system 708 (and/or an account associated with merchant system 708).

The number and arrangement of systems, devices, and/or networks shown in FIG. 7 are provided as an example. There may be additional systems, devices, and/or networks; fewer systems, devices, and/or networks; different systems, devices, and/or networks; and/or differently arranged systems, devices, and/or networks than those shown in FIG. 7. Furthermore, two or more systems or devices shown in FIG. 7 may be implemented within a single system or device, or a single system or device shown in FIG. 7 may be implemented as multiple, distributed systems or devices. Additionally or alternatively, a set of systems (e.g., one or more systems) or a set of devices (e.g., one or more devices) of environment 700 may perform one or more functions described as being performed by another set of systems or another set of devices of environment 700.

Although the disclosure has been described in detail for the purpose of illustration based on what is currently considered to be the most practical and non-limiting embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A computer-implemented method comprising:
receiving, with at least one processor, a plurality of embedding vectors from a neural network model;
determining, with the at least one processor, a bias vector by:
generating, with the at least one processor, two clusters of embedding vectors based on the plurality of embedding vectors, the two clusters comprising a first cluster of embedding vectors expected to be biased in a first direction and a second cluster expected to be biased in a second direction;
determining, with the at least one processor, a first mean vector of the first cluster of embedding vectors and a second mean vector of the second cluster of embedding vectors;
modifying, with the at least one processor, the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector;
replacing, with the at least one processor, the first mean vector with a first candidate vector of the plurality of first candidate vectors based on the bias score of the first candidate vector;
modifying, with the at least one processor, the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine the bias score associated with each second candidate vector;
replacing, with the at least one processor, the second mean vector with a second candidate vector of the plurality of second candidate vectors based on the bias score of the second candidate vector; and
repeating, with the at least one processor, the modifying of the first mean vector, the replacing of the first mean vector, the modifying of the second mean vector, and the replacing of the second mean vector until an extremum of the bias score is reached,
wherein the bias vector is based on a direction defined between the first mean vector and the second mean vector;
in response to reaching the extremum of the bias score, linearly projecting, with the at least one processor, each embedding vector of the plurality of embedding vectors along the bias vector to debias the plurality of embedding vectors to provide a plurality of debiased embedding vectors;
training, with at least one processor, a machine learning model of a fraud monitoring system based on the plurality of debiased embedding vectors;
receiving, with at least one processor, an authorization request associated with a transaction; and
declining, with at least one processor, the transaction associated with the authorization request based on the machine learning model of the fraud monitoring system as trained based on the plurality of debiased embedding vectors.

2. The computer-implemented method of claim 1, wherein the plurality of embedding vectors are vector representations of merchant identity embeddings generated from customer transaction data.

3. The computer-implemented method of claim 1, wherein the bias score is calculated from a Word Embedding Association Test (WEAT).

4. The computer-implemented method of claim 1, wherein the bias score is calculated from an Embedding Coherence Test (ECT).

5. The computer-implemented method of claim 1, further comprising, before modifying the first mean vector and the second mean vector, determining, with the at least one processor, an initial bias score by linearly projecting the embedding vectors of both the first cluster and the second cluster along an initial direction defined between the first mean vector and the second mean vector, wherein:

the replacing of the first mean vector with the first candidate vector of the plurality of first candidate vectors is based on maximizing a difference between the initial bias score and the bias score of the first candidate vector; and the replacing of the second mean vector with the second candidate vector of the plurality of second candidate vectors is based on maximizing a difference between the initial bias score and the bias score of the second candidate vector.

6. A system comprising at least one server comprising at least one processor, the at least one server programmed or configured to:

receive a plurality of embedding vectors from a neural network model;

determine a bias vector by:

generating two clusters of embedding vectors based on the plurality of embedding vectors, the two clusters comprising a first cluster of embedding vectors expected to be biased in a first direction and a second cluster expected to be biased in a second direction;

determining a first mean vector of the first cluster of embedding vectors and a second mean vector of the second cluster of embedding vectors;

modifying the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector;

replacing the first mean vector with a first candidate vector of the plurality of first candidate vectors based on the bias score of the first candidate vector;

modifying the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine the bias score associated with each second candidate vector;

replacing the second mean vector with a second candidate vector of the plurality of second candidate vectors based on the bias score of the second candidate vector; and repeating the modifying of the first mean vector, the replacing of the first mean vector, the modifying of the second mean vector, and the replacing of the second mean vector until an extremum of the bias score is reached, wherein the bias vector is based on a direction defined between the first mean vector and the second mean vector;

in response to reaching the extremum of the bias score, linearly project each embedding vector of the plurality of embedding vectors along the bias vector to debias the plurality of embedding vectors to provide a plurality of debiased embedding vectors;

train a machine learning model of a fraud monitoring system based on the plurality of debiased embedding vectors;

receive an authorization request associated with a transaction; and decline the transaction associated with the authorization request based on the machine learning model of the fraud monitoring system as trained based on the plurality of debiased embedding vectors.

7. The system of claim 6, wherein the plurality of embedding vectors are vector representations of merchant identity embeddings generated from customer transaction data.

8. The system of claim 6, wherein the bias score is calculated from a Word Embedding Association Test (WEAT).

9. The system of claim 6, wherein the bias score is calculated from an Embedding Coherence Test (ECT).

10. The system of claim 6, wherein the at least one server is further programmed or configured to, before modifying the first mean vector and the second mean vector, determine an initial bias score by linearly projecting the embedding vectors of both the first cluster and the second cluster along an initial direction defined between the first mean vector and the second mean vector, and wherein:

the replacing of the first mean vector with the first candidate vector of the plurality of first candidate vectors is based on maximizing a difference between the initial bias score and the bias score of the first candidate vector; and the replacing of the second mean vector with the second candidate vector of the plurality of second candidate vectors is based on maximizing a difference between the initial bias score and the bias score of the second candidate vector.

11. A computer program product comprising at least one non-transitory computer-readable medium including program instructions that, when executed by at least one processor, cause the at least one processor to:

receive a plurality of embedding vectors from a neural network model;

determine a bias vector by:

generating two clusters of embedding vectors based on the plurality of embedding vectors, the two clusters comprising a first cluster of embedding vectors expected to be biased in a first direction and a second cluster expected to be biased in a second direction;

determining a first mean vector of the first cluster of embedding vectors and a second mean vector of the second cluster of embedding vectors;

modifying the first mean vector by moving the first mean vector toward each embedding vector of the first cluster of embedding vectors to provide a plurality of first candidate vectors and linearly projecting the embedding vectors of both the first cluster and the second cluster along a first direction defined between the second mean vector and each first candidate vector to determine a bias score associated with each first candidate vector;

replacing the first mean vector with a first candidate vector of the plurality of first candidate vectors based on the bias score of the first candidate vector;

modifying the second mean vector by moving the second mean vector toward each embedding vector of the second cluster of embedding vectors to provide a plurality of second candidate vectors and linearly projecting the embedding vectors of both the first cluster and the second cluster along a second direction defined between the first mean vector and each second candidate vector to determine the bias score associated with each second candidate vector;

replacing the second mean vector with a second candidate vector of the plurality of second candidate vectors based on the bias score of the second candidate vector; and repeating the modifying of the first mean vector, the replacing of the first mean vector, the modifying of the second mean vector, and the replacing of the second mean vector until an extremum of the bias score is reached, wherein the bias vector is based on a direction defined between the first mean vector and the second mean vector;

in response to reaching the extremum of the bias score, linearly project each embedding vector of the plurality of embedding vectors along the bias vector to debias the plurality of embedding vectors to provide a plurality of debiased embedding vectors;

train a machine learning model of a fraud monitoring system based on the plurality of debiased embedding vectors;

receive an authorization request associated with a transaction; and decline the transaction associated with the authorization request based on the machine learning model of the fraud monitoring system as trained based on the plurality of debiased embedding vectors.

12. The computer program product of claim 11, wherein the plurality of embedding vectors are vector representations of merchant identity embeddings generated from customer transaction data.

13. The computer program product of claim 11, wherein the bias score is calculated from a Word Embedding Association Test (WEAT).

14. The computer program product of claim 11, wherein the bias score is calculated from an Embedding Coherence Test (ECT).

15. The computer program product of claim 11, wherein the instructions, when executed by at least one processor, further cause the at least one processor to, before modifying the first mean vector and the second mean vector, determine an initial bias score by linearly projecting the embedding vectors of both the first cluster and the second cluster along an initial direction defined between the first mean vector and the second mean vector, and wherein:

the replacing of the first mean vector with the first candidate vector of the plurality of first candidate vectors is based on maximizing a difference between the initial bias score and the bias score of the first candidate vector; and the replacing of the second mean vector with the second candidate vector of the plurality of second candidate vectors is based on maximizing a difference between the initial bias score and the bias score of the second candidate vector.

\* \* \* \* \*